(12) United States Patent
Kondo et al.

(10) Patent No.: US 9,481,394 B2
(45) Date of Patent: Nov. 1, 2016

(54) ANGLE DETECTION APPARATUS, MOTOR HAVING THE ANGLE DETECTION APPARATUS, TORQUE SENSOR, ELECTRIC POWER STEERING APPARATUS, AND VEHICLE

(71) Applicant: NSK Ltd., Shinagawa-ku, Tokyo (JP)

(72) Inventors: Kei Kondo, Kanagawa (JP); Toshiaki Oguchi, Kanagawa (JP); Yusuke Imai, Kanagawa (JP); Tomoki Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/894,103

(22) PCT Filed: Aug. 7, 2015

(86) PCT No.: PCT/JP2015/003988
§ 371 (c)(1),
(2) Date: Nov. 25, 2015

(87) PCT Pub. No.: WO2016/021207
PCT Pub. Date: Feb. 11, 2016

(65) Prior Publication Data
US 2016/0194027 A1 Jul. 7, 2016

(30) Foreign Application Priority Data
Aug. 8, 2014 (JP) .................................. 2014-162192

(51) Int. Cl.
*G01D 5/244* (2006.01)
*B62D 15/02* (2006.01)
(Continued)

(52) U.S. Cl.
CPC .............. *B62D 15/021* (2013.01); *B62D 5/04* (2013.01); *G01D 5/20* (2013.01); *G01D 5/345* (2013.01)

(58) Field of Classification Search
CPC ........ G01D 5/20; G01D 5/345; G01D 5/347; G01D 5/34707; B62D 15/021; B62D 5/04
USPC ................................ 318/400.4, 400.37, 640
See application file for complete search history.

(56) References Cited

U.S. PATENT DOCUMENTS

2002/0124663 A1* 9/2002 Tokumoto ................ B62D 6/10
73/862.333
2003/0090223 A1* 5/2003 Nishizawa ............. G01D 3/022
318/268

(Continued)

FOREIGN PATENT DOCUMENTS

JP 2007-52001 A 3/2007
JP 2012-145371 A 8/2012

OTHER PUBLICATIONS

Japanese-language Written Opinion (PCT/ISA/237) issued in PCT Application No. PCT/JP2015/003988 dated Sep. 8, 2015 (three (3) pages).

*Primary Examiner* — Huy Q Phan
*Assistant Examiner* — Adam Clarke
(74) *Attorney, Agent, or Firm* — Crowell & Moring LLP

(57) ABSTRACT

There are provided an angle detection apparatus configured to correct an error included in angle information output from a multipolar angle detector, a motor having the angle detection apparatus, a torque sensor, an electric power steering apparatus, and a vehicle. A multiplication circuit (12) generates digital electrical angle information (θed) from analog angle information output from a multipolar optical encoder (11), a first differentiator 30 differentiates the electrical angle information (θed) to operate an electrical angular velocity (ωed), a first discontinuity correction circuit (31) carries out processing of correcting a discontinuity of an angular velocity in a temporal change for the electrical angular velocity (ωed), and a digital filter (32) carries out correction processing of reducing a high-frequency noise component for an electrical angular velocity (ωedc) corrected by the first discontinuity correction circuit (31).

13 Claims, 13 Drawing Sheets

(51) Int. Cl.
*B62D 5/04* (2006.01)
*G01D 5/34* (2006.01)
*G01D 5/20* (2006.01)

(56) References Cited

U.S. PATENT DOCUMENTS

| | | | | |
|---|---|---|---|---|
| 2005/0274878 A1* | 12/2005 | Goldman | ............... | G01D 5/38 250/231.13 |
| 2007/0029955 A1 | 2/2007 | Kanekawa et al. | | |
| 2008/0073493 A1* | 3/2008 | Atsuta | ............... | G01D 5/2457 250/229 |
| 2009/0167296 A1* | 7/2009 | Yokokawa | ............ | G01D 5/2073 324/207.25 |
| 2012/0291764 A1* | 11/2012 | Sato | ............... | F02P 5/1506 123/612 |
| 2014/0360804 A1* | 12/2014 | Oguchi | ............... | G01D 5/3473 180/446 |

\* cited by examiner

ANGLE DETECTION APPARATUS, MOTOR HAVING THE ANGLE DETECTION APPARATUS, TORQUE SENSOR, ELECTRIC POWER STEERING APPARATUS, AND VEHICLE

TECHNICAL FIELD

The present invention relates to a technology of correcting angle information that has been detected by use of a multipolar angle detector.

BACKGROUND ART

As a technology of correcting angle information that has been detected by use of an angle detector, in one technology, for example, there is a technology described in patent literature 1. In this technology, an angle signal is detected from a signal detected by a resolver, the detected angle signal is differentiated for detecting a speed signal, and an error is estimated by use of the detected speed signal. Then, the speed signal is corrected by use of the estimated error and the corrected speed signal is integrated, so as to obtain the angle signal in which the error is corrected.

CITATION LIST

Patent Literature

PLT 1: JP 2012-145371 A

SUMMARY

Technical Problem

When the prior art technology of the above patent literature 1 is applied to a multipolar resolver, since, in the multipolar resolver, an electrical angle rotates several times relative to a single rotation of mechanical angle, and a signal for every single cycle of electrical angle corresponding to each pole will be output sequentially from the resolver. Thus, when the angle signal is detected from the signal detected by the multipolar resolver, the angle signal for every single cycle of electrical angle (0 degrees to 360 degrees) is detected. In particular, when a digital angle signal for every single cycle of electrical angle is detected and the speed signal is detected by differentiating the digital angle signal, the angle signal suddenly changes from 360 degrees to 0 degrees in the change of the pole, and thus the speed signal also suddenly changes (in a stepwise manner) at this timing. When an error is estimated by use of such a speed signal, the error estimation accuracy will degrade.

Therefore, the present invention has been made in view of unsolved drawback in one technology, and has an object to provide an angle detection apparatus suited to correct the error included in the angle information output from a multipolar angle detector, a motor having the angle detection apparatus, a torque sensor, an electric power steering apparatus, and a vehicle.

Solution to Problem

In order to address the above drawback, according to a first aspect of the present invention, there is provided an angle detection apparatus, including: a multipolar angle detector having a plurality of poles and configured to output an analog angle information signal corresponding to one cycle of an electrical angle for each of the plurality of poles; a converter configured to convert the analog angle information signal output from the multipolar angle detector into a first angle signal, which is a digital angle signal for the one cycle of the electrical angle; a first angular velocity signal detector configured to differentiate the first angle signal to detect a first angular velocity signal; a first discontinuity correction unit configured to correct a value of an angular velocity that is discontinuous in a temporal change of the first angular velocity signal, among the angular velocities indicated by the first angular velocity signals detected by the first angular velocity signal detector, to a value having a continuity; an angular velocity signal correction unit configured to carry out correction processing of reducing an error component included in the first angular velocity signal corrected by the first discontinuity correction unit; and a second angle signal detector configured to integrate the first angular velocity signal corrected by the angular velocity signal correction unit to detect a second angle signal.

In addition, in order to address the above drawback, according to a second aspect of the present invention, there is provided a motor including the angle detection apparatus according to the above first aspect.

Further, in order to address the above drawback, according to a third aspect of the present invention, there is provided a torque sensor including the angle detection apparatus according to the above first aspect.

Furthermore, in order to address the above drawback, according to a fourth aspect of the present invention, there is provided an electric power steering apparatus including the angle detection apparatus according to the above first aspect.

Moreover, in order to address the above drawback, according to a fifth aspect of the present invention, there is provided a vehicle including the angle detection apparatus according to the above first aspect.

Advantageous Effects

According to the present invention, the first discontinuous correction unit is configured to correct a value of the angular velocity that is discontinuous in temporal change of the first angular velocity signal, among the angular velocities indicated by the first angular velocity signal detected by the first angular velocity signal detector, so as to have a value with a continuity. It is possible to prevent an occurrence of error caused by the first angular velocity signal that is discontinuous.

In addition, as a motor is configured with the angle detection apparatus having the above effectiveness, it is possible to provide the motor having a relatively high positioning accuracy and the like.

Further, as a torque sensor is configured with the angle detection apparatus having the above effectiveness, it is possible to provide the torque sensor having a relatively high positioning accuracy and the like.

Furthermore, as an electric power steering apparatus is configured with the angle detection apparatus having the above effectiveness, it is possible to provide the electric power steering apparatus having a relatively high reliability, by applying the angle detection apparatus to the angle detection of the torque sensor, the assist motor, or the like.

Moreover, as a vehicle is configured with the angle detection apparatus having the above effectiveness, it is possible to provide the vehicle having a relatively high reliability and the like, by applying the angle detection apparatus to the torque sensor, the assist motor, or the like, mounted in the vehicle.

DESCRIPTION OF EMBODIMENTS

First Embodiment (Configuration)

Figure 1:
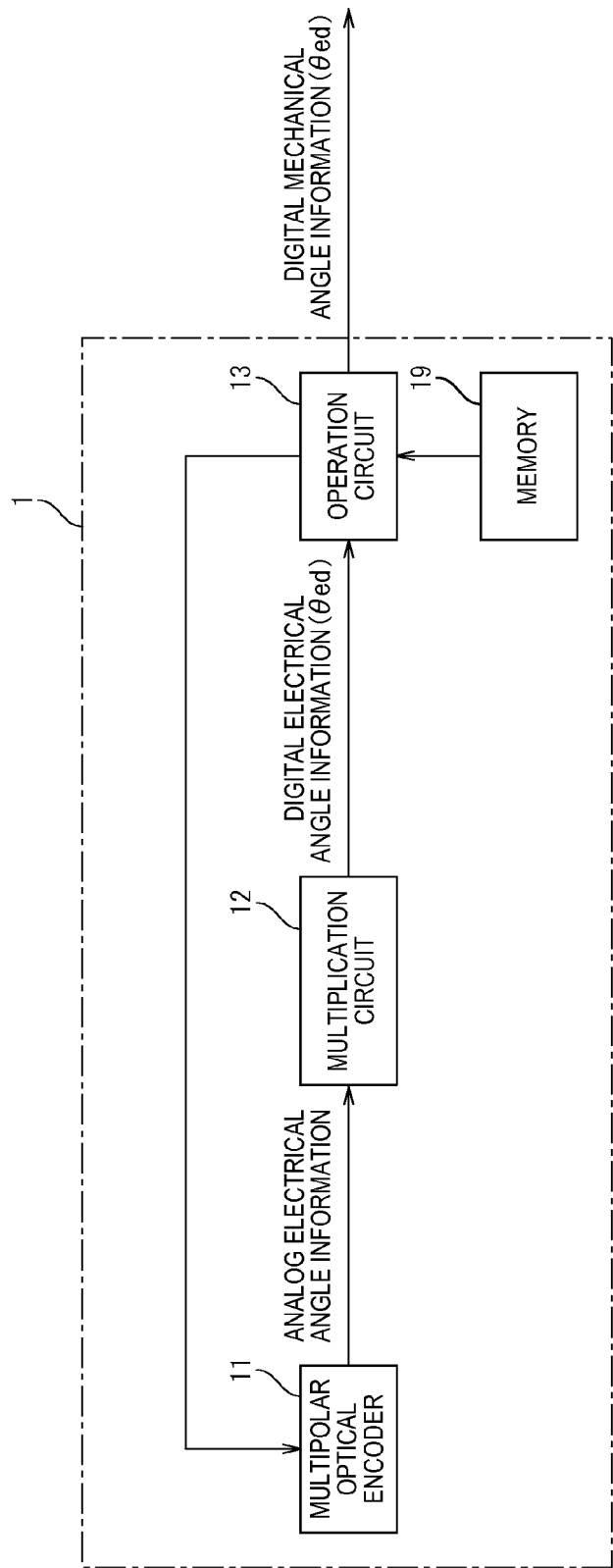
FIG. 1 is a block diagram illustrative of a configuration of an angle detection apparatus in a first embodiment.

A first angle detection apparatus 1 in a first embodiment includes, as illustrated in FIG. 1, a multipolar optical encoder 11 configured to detect angle information (positional information) of a detection target, and a multiplication circuit 12 configured to convert analog electrical angle information from the multipolar optical encoder 11 into digital electrical angle information of a predefined resolution.

The first angle detection apparatus 1 further includes an operation circuit 13 configured to correct an error component included in the electrical angle information θed based on the digital electrical angle information (θed) from the multiplication circuit 12, and to operate digital mechanical angle information (θmd) of the detection target, and a memory 19 in which angle correction data (to be described later) is stored.

(Multipolar Optical Encoder 11)

Figure 2A:
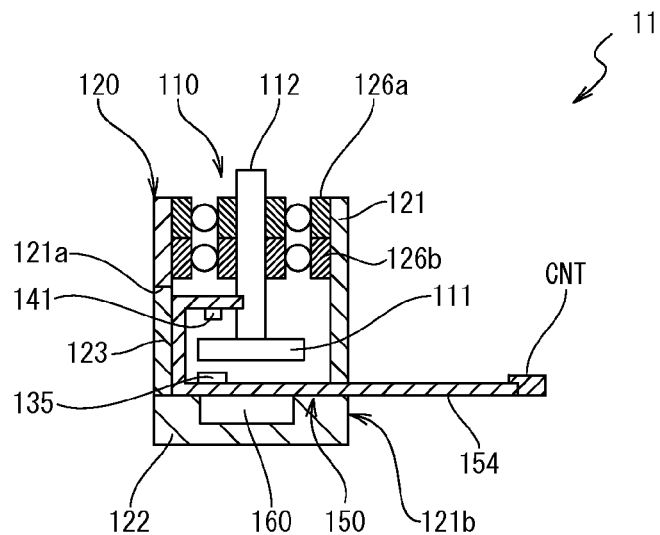
FIG. 2A and FIG. 2B are views illustrative of a configuration example of a multipolar encoder in the first embodiment.

The multipolar optical encoder 11, as illustrated in FIG. 2A, includes a light source 141, a detector 135 configured to detect a source light from the light source 141 across a detected area, and a substrate 150 on which the light source 141 and the detector 135 are arranged.

The multipolar optical encoder 11 further includes a shaft 112 coupled with a rotary machine such as a motor, a rotor 110 having an optical scale 111 attached at an end of the shaft 112, and a stator 120. The stator 120 includes a body 121 having an opening 121a and a cutout unit 121b, a chassis 122 in which the substrate 150 is arranged, and a cover 123 configured to cover the opening 121a.

The chassis 122 in which the substrate 150 is arranged is attached to the body 121 through the opening 121a. A harness unit 154 and a connector CNT of the substrate 150 are configured to extend to the exterior through the cutout unit 121b. The harness unit 154 includes signal lines and power lines connected to various types of circuits provided in the light source 141, the detector 135, and the substrate 150. The connector CNT is connected with the harness unit 154 in order to connect the multipolar optical encoder 11 to another unit (the multiplication circuit 12 in the first embodiment).

In addition, the shaft 112 is rotatably supported by the body 121 through bearings 126a and 126b. Further, the body 121 is configured to have a cylindrical shape that surrounds the bearings 126a and 126b, the shaft 112, the optical scale 111, and the detector 135, and is configured with a member having a light blocking property.

The detector 135 is a sensor configured to detect a change of the source light generated by a change (rotation) of the optical scale 111 in the detected area, and to make an output depending on the change of the detection result. That is to say, the multipolar optical encoder 11 functions as a rotary encoder configured to detect the angular position of the rotary driver that is connected to transmit rotational movements to the rotor 110.

Figure 2B:
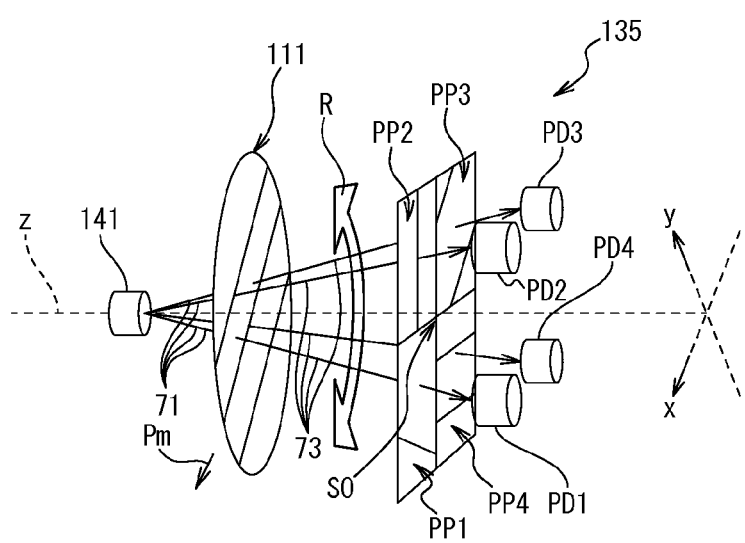

The detector 135, as illustrated in FIG. 2B, includes a first light-receiving unit PD1 having a first polarized light layer PP1, a second light-receiving unit PD2 having a second polarized light layer PP2, a third light-receiving unit PD3 having a third polarized light layer PP3, and a fourth light-receiving unit PD4 having a fourth polarized light layer PP4.

As illustrated in FIG. 2B, distances to an arrangement center S0 from the first light-receiving unit PD1, the second light-receiving unit PD2, the third light-receiving unit PD3, and the fourth light-receiving unit PD4 are same, in one embodiment.

The light source 141 is configured with, for example, a light emitting diode, a semiconductor laser such as a perpendicular resonator surface emitting laser, a filament, or the like. The source light 71 irradiated from the light source 141, as illustrated in FIG. 2B, is configured to pass through the optical scale 111, pass through the first polarized light layer PP1, the second polarized light layer PP2, the third polarized light layer PP3, and the fourth polarized light layer PP4, as a transmitted light 73, and then enter the first light-receiving unit PD1, the second light-receiving unit PD2, the third light-receiving unit PD3, and the fourth light-receiving unit PD4, respectively.

The polarized light axis divided by the first polarized light layer PP1 and the polarized light axis divided by the second polarized light layer PP2 are relatively different from each other by 45 degrees, and the polarized light axis divided by the second polarized light layer PP2 and the polarized light axis divided by the third polarized light layer PP3 are relatively different from each other by 45 degrees. In addition, the polarized light axis divided by the third polarized light layer PP3 and the polarized light axis divided by the fourth polarized light layer PP4 are relatively different from each other by 45 degrees, and the polarized light axis divided by the fourth polarized light layer PP4 and the polarized light axis divided by the first polarized light layer PP1 are relatively different from each other by 45 degrees.

Figure 3:
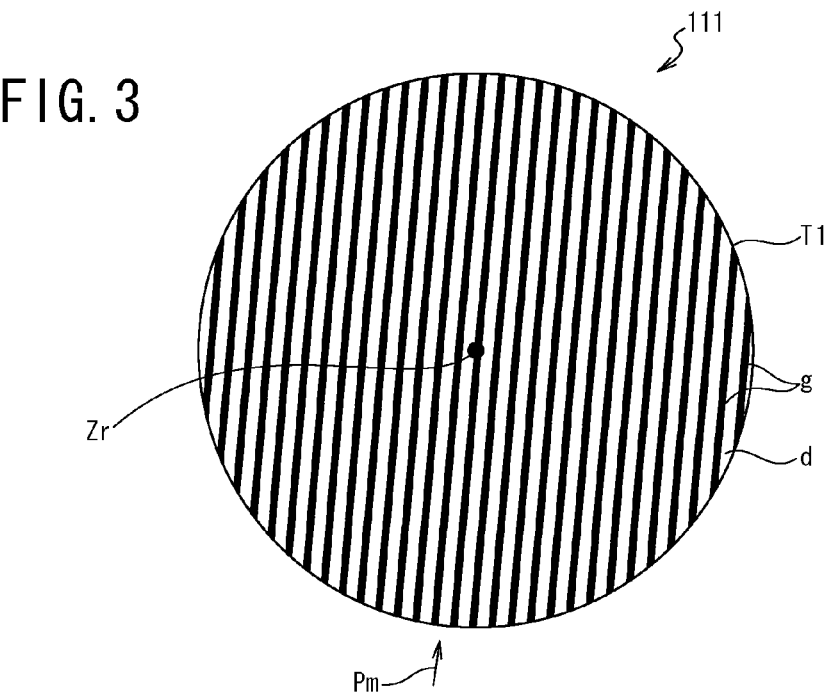
FIG. 3 is a view illustrative of a pattern example of an optical scale in the first embodiment.

The optical scale 111 is a member having a disk shape, as illustrated in FIG. 3, and is made of, for example, silicone, glass, a high polymeric material, or the like. It is to be noted that the optical scale 111 is not limited to a disk shape, and may have another shape such as polygonal, circular (ring shape), or the like.

The optical scale 111, as illustrated in FIG. 3, includes a signal track T1 in one of the sheet faces. This signal track T1 includes a sequence of thin metallic wires (wires) g, which is called wire grid pattern. Specifically, the wire grid pattern is, as illustrated in FIG. 3, a pattern in which linear thin metallic wires g are arranged such that adjacent thin metallic wires are in parallel to each other at equal intervals. Therefore, the optical scale 111 is configured to have same polarized light axis, regardless of the location where the source light 71 is irradiated, and the polarization direction of the polarizer in the plane faces one direction.

In the configuration as mentioned above, when the shaft 112 of the rotor 110 rotates, the multipolar optical encoder 11 is configured such that, as illustrated in FIG. 2B, the optical scale 111 moves, for example, in an R direction relatively to the detector 135. Hence, the signal track T1 of the optical scale 111 moves relatively to the detector 135. In the optical scale 111, a polarization direction Pm of the polarizer in the plane faces a predefined direction, and such a polarization direction Pm changes by the rotation. The detector 135 receives an incident light (transmitted light) 73 that enters after the source light 71 from the light source 141 passes through the optical scale 111, and is then capable of reading the signal track T1 of the optical scale 111 illustrated in FIG. 3.

Figure 4:
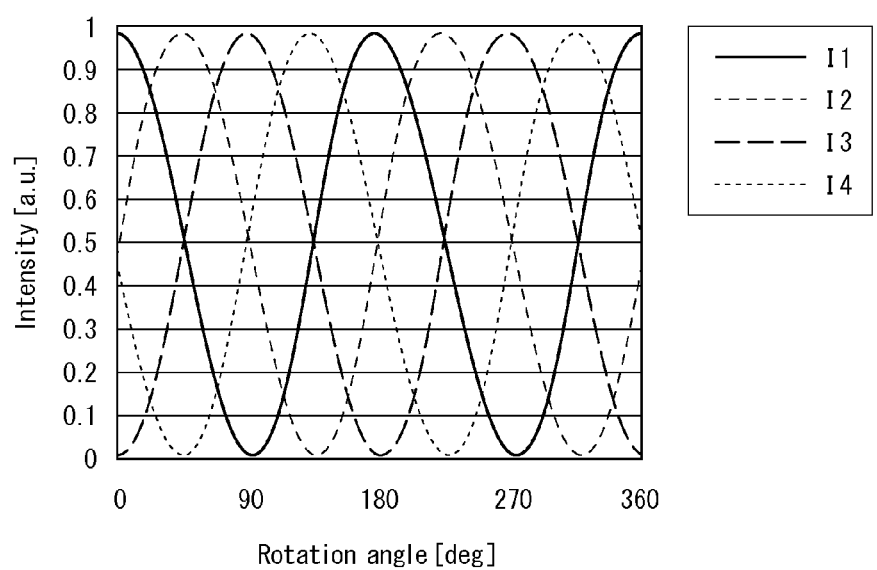
FIG. 4 is a view illustrative of an example of relationship between a rotation angle of the optical scale and a light intensity change of polarized component of each receiving unit in the first embodiment.

The polarization direction Pm of the transmitted light 73 can be represented by an optical intensity PI(−) of a first polarization direction component, and an optical intensity PI(+) of a second polarization direction component, which is different from the first polarization direction by 90 degrees. Outputs from the first light-receiving unit PD1, the second light-receiving unit PD2, the third light-receiving unit PD3, and the fourth light-receiving unit PD4, corresponding to the optical intensity PI(−) and the optical intensity PI(+), which are the detection signals of the detector 135, are optical intensities I1, I2, I3, and I4 with deviated phases, depending on the rotation of the optical scale 111, as illustrated in FIG. 4.

In addition, the optical scale 111 includes an angle information operation circuit 160, as illustrated in FIG. 2A.

The angle information operation circuit 160 is not illustrated, but includes a preamplifier AMP, a differential operation circuit DS, and a filter circuit NR. Then, the detection signals I1, I2, I3, and I4 output from the detector 135 are amplified by the preamplifier AMP, and operation processing of differential signals Vc and Vs indicated in the following expressions (1) and (2) at the differential operation circuit DS by use of the amplified detection signals I1, I2, I3, and I4. Further, the filter circuit NR removes noises from the differential signals Vc and Vs. The differential signals Vc and Vs, from which noises are removed, are output to the multiplication circuit 12, as analog angle information.

$$Vc=(I1-I3)/(I1+I3) \quad (1)$$

$$Vs=(I2-I4)/(I2+I4) \quad (2)$$

(Multiplication Circuit 12)

The multiplication circuit 12 is configured to operate a Lissajous pattern from the differential signals Vc and Vs input from the angle information operation circuit 160, and to operate digital angle information of an rotation angle of the rotor 110 that has rotated from the initial position. Herein, since the differential signals Vc and Vs are differential signals deviating by a λ/4 phase, the Lissajous pattern with a cosine curve of the differential signal Vc in the horizontal axis and a sine curve of the differential signal Vs in the vertical axis is operated to determine a Lissajous angle (electrical angle) depending on the rotation angle of the rotor 110. In the first embodiment, it is configured such that when the rotor 110 (mechanical angle) rotates a single rotation, the electrical angle rotates two cycles. That is, the multipolar optical encoder 11 in the first embodiment can be a bipolar optical encoder.

Thus, the multiplication circuit 12 is configured to output digital angle information on each pole for a single cycle of electrical angle (0 degrees to 360 degrees) to the operation circuit 13, depending on the rotation angle of the rotor 110. While the rotor 110 is rotating a single rotation, the digital angle information for two cycles of the electrical angle is output to the operation circuit 13. In addition, the multiplication circuit 12 has a function of electrically enhancing the resolution (for example, 12 bits) of an input signal to a predefined resolution (for example, 16 bits). Thus, the multiplication circuit 12 is configured to output the digital electrical angle information of a predefined resolution to the operation circuit 13.

(Operation Circuit 13)

Figure 5:
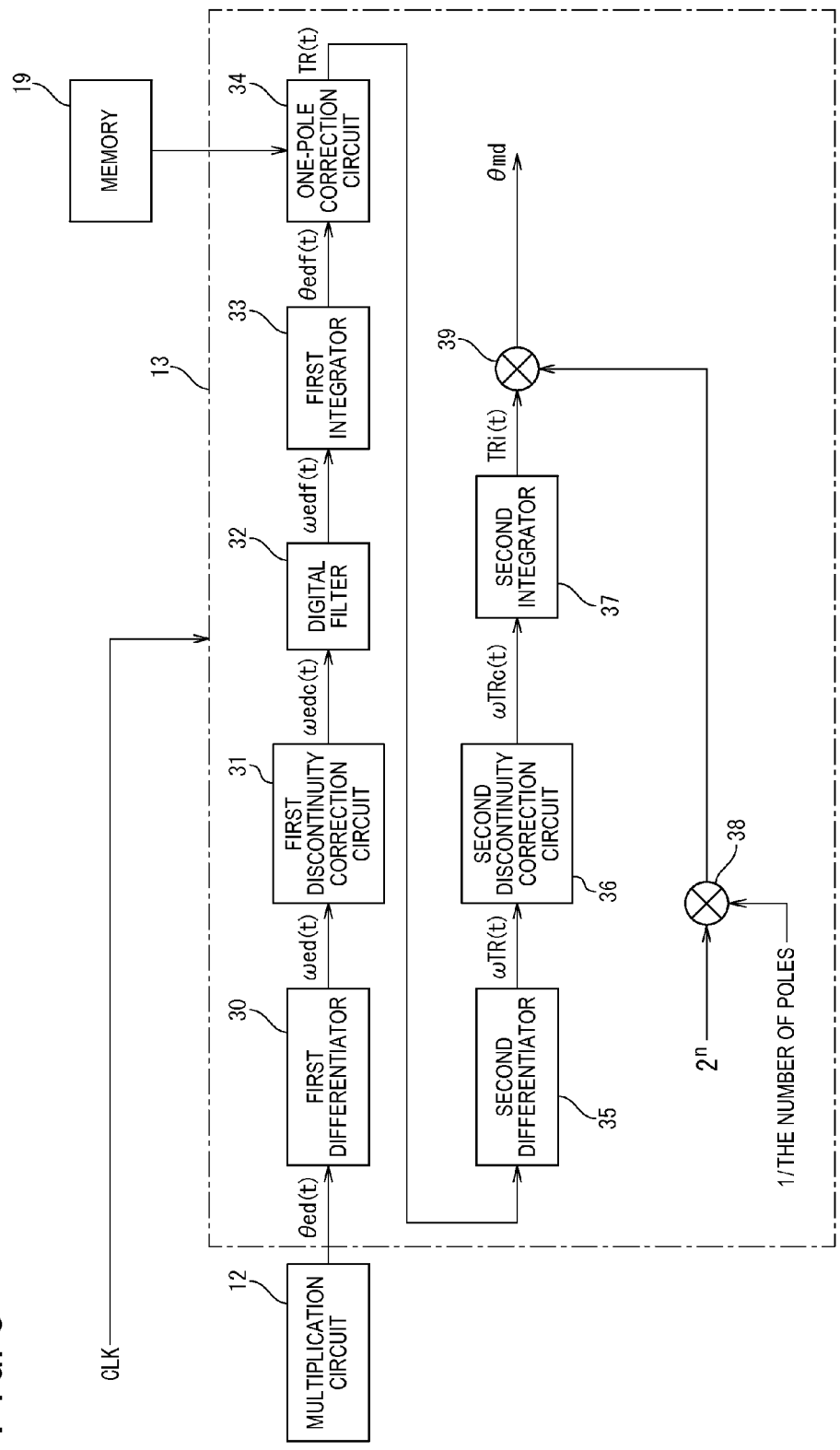
FIG. 5 is a block diagram illustrative of a configuration example of an operation circuit in the first embodiment.

As illustrated in FIG. 5, the operation circuit 15 includes a first differentiator 30, a first discontinuity correction circuit 31, a digital filter 32, a first integrator 33, a one-pole correction circuit 34, a second differentiator 35, a second discontinuity correction circuit 36, a second integrator 37, a first multiplier 38, and a second multiplier 39.

It is to be noted that the operation circuit 13 in the first embodiment is configured with FPGA. That is to say, in the operation circuit 13, each component circuit is a circuit that is designed (programmed) in a hardware description language.

In addition, as illustrated in FIG. 5, a clock signal CLK (hereinafter, simply referred to as "CLK") is supplied to the operation circuit 13 from a crystal oscillator, not illustrated.

Figure 6A:
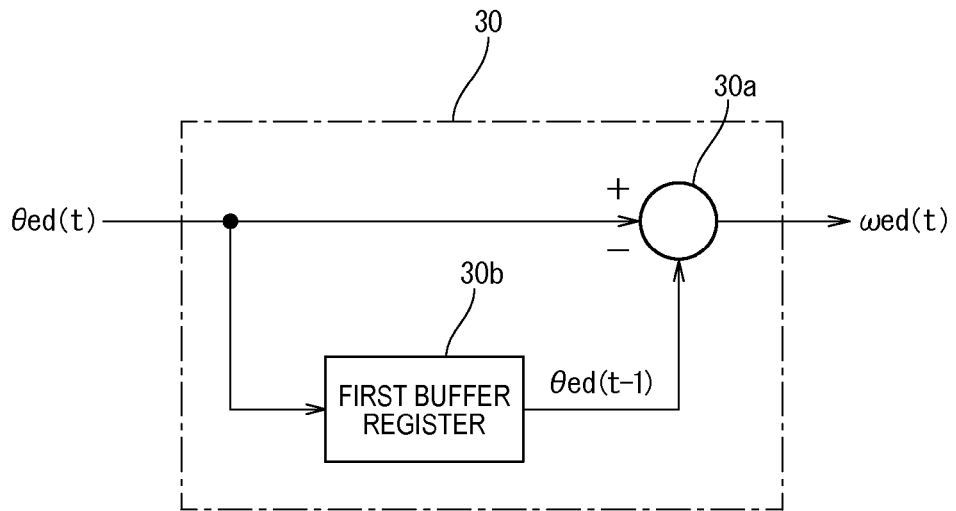
FIG. 6A is a circuit diagram illustrative of an example of a first differentiator in the first embodiment.

As illustrated in FIG. 6A, the first differentiator 30 includes a first subtractor 30a and a first buffer register 30b. One of two input terminals of the first subtractor 30a and an input terminal of the first buffer register 30b are electrically connected with each other, and digital electrical angle information θed(t) (hereinafter, simply referred to as "electrical angle θed(t)" in some cases) from the multiplication circuit 12 is input into the first subtractor 30a and the first buffer register 30b in synchronization with CLK. In addition, an output terminal of the first buffer register 30b is connected with the other input terminal of the first subtractor 30a, so that an output from the first buffer register 30b is input into the first subtractor 30a. The first buffer register 30b serves as a delay element, such that the electrical angle θed(t) is delayed until the electrical angle θed(t+1) is input (for example, one-clock delay), and is then input to the other input terminal of the first subtractor 30a.

In such a configuration, in the first subtractor 30a, a previous electrical angle θed(t−1) that has been input one before is subtracted from the current electrical angle θed(t). That is to say, in the first differentiator 30, a digital electrical angular velocity ωed(t) (hereinafter, simply referred to as "electrical angular velocity ωed(t)" in some cases), which is a temporal change of the electrical angle θed(t), is operated. The first differentiator 30 outputs the electrical angular velocity ωed(t), which is an operation result, to the first discontinuity correction circuit 31.

The first discontinuity correction circuit 31 is a circuit configured to correct the electrical angular velocity ωed(t), which is discontinuous at the timing when the pole is changed, in order to maintain a continuity.

The electrical angle θed(t) input from the multiplication circuit 12 is angle information that changes from 0 degrees to 360 degrees for each pole, and in addition, the multipolar optical encoder 11 is a bipolar optical encoder. Hence, while the rotor 110 is rotating one rotation, the electrical angle rotates two cycles. Thus, at a changing point from the first cycle to the second cycle of the electrical angle, the digital electrical angle θed(t) suddenly changes from 360 degrees to 0 degrees, for example. Such a sudden change is output as a large electrical angular velocity ωed(t).

When the electrical angular velocity ωed(t) which is largely higher than a maximum rotation velocity is input, the first discontinuity correction circuit 31 in the first embodiment is configured to determine that the electrical angle θed(t) makes a change, and to correct the electrical angular velocity ωed(t) at this timing, because the maximum rotation velocity (highest angular velocity) of the rotor 110 is known.

Figure 7A:
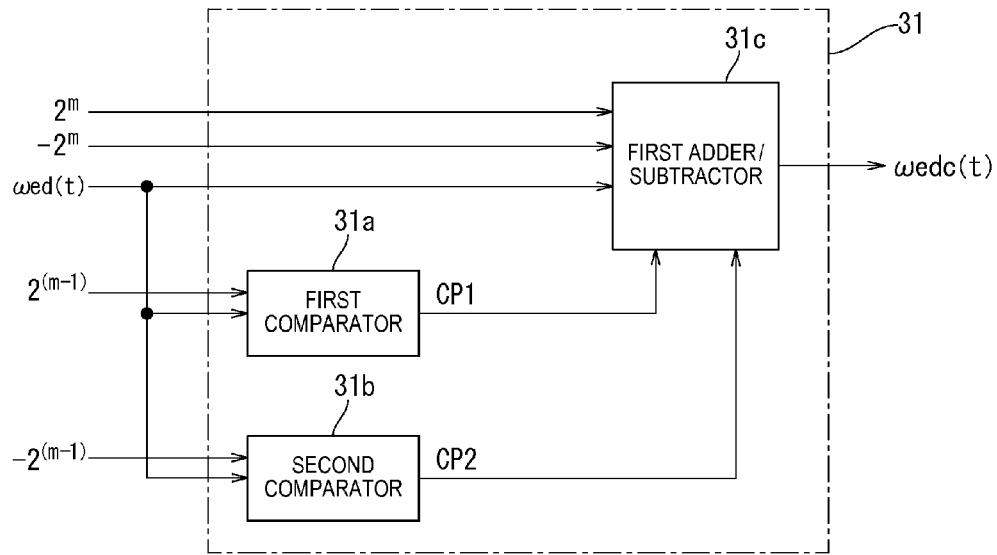
FIG. 7A is a circuit diagram illustrative of an example of a first discontinuity correction circuit in the first embodiment.

Specifically, the first discontinuity correction circuit 31 in the first embodiment includes a first comparator 31a, a second comparator 31b, and a first adder/subtractor 31c, as illustrated in FIG. 7A.

When the resolution of the electrical angular velocity ωed(t) is set to "$2^m$" (where m is a natural number equal to or larger than 2), the first comparator 31a is configured to compare the electrical angular velocity ωed(t) with "$2^{(m-1)}$" that is a velocity threshold. When the electrical angular velocity ωed is equal to or larger than "$2^{(m-1)}$", the first comparator 31a outputs a first comparison signal CP1 of a logical value "1" to the first adder/subtractor 31c, whereas when the electrical angular velocity ωed(t) is smaller than "$2^{(m-1)}$", the first comparator 31a outputs a first comparison signal CP1 of a logical value "0" to the first adder/subtractor 31c.

The second comparator 31b is configured to compare the electrical angular velocity ωed(t) with "$-2^{(m-1)}$". When the electrical angular velocity ωed(t) is equal to or smaller than "$-2^{(m-1)}$", the second comparator 31b outputs a second comparison signal CP2 of a logical value "1" to the first adder/subtractor 31c, whereas when the electrical angular velocity ωed(t) is larger than "$-2^{(m-1)}$", the second comparator 31b outputs a second compare signal CP2 of a logical value "0" to the first adder/subtractor 31c.

The first adder/subtractor 31c subtracts "$2^m$" from the electrical angular velocity ωed(t), when the first comparison signal CP1 is "1" and the second comparison signal CP2 is "0". Then, the first adder/subtractor 31c outputs the electrical angular velocity ωedc(t) of a subtraction result to the digital filter 32.

In addition, the first adder/subtractor 31c adds "$2^m$" to the electrical angular velocity ωed(t), when the first comparison signal CP1 is "0" and the second comparison signal CP2 is "1". Then, the first adder/subtractor 31c outputs the electrical angular velocity ωedc(t) of an addition result to the digital filter 32.

On the other hand, the first adder/subtractor 31c outputs the electrical angular velocity ωed(t) that has been input to the digital filter 32 without change, when the first comparison signal CP1 is "0" and the second comparison signal CP2 is "0". It is to be noted that the output signal is also referred to as electrical angular velocity ωedc(t), also in this case.

It is to be noted that the information on the resolution of the electrical angle is supposed to be stored in the memory 19 beforehand.

The digital filter 32 is configured with a digital low pass filter, and has a function of reducing a high-frequency noise component included in the electrical angular velocity ωedc(t) from the first discontinuity correction circuit 31. The digital filter 32 outputs an electrical angular velocity ωedf(t) subjected to the filter processing to the first integrator 33.

Figure 8A:
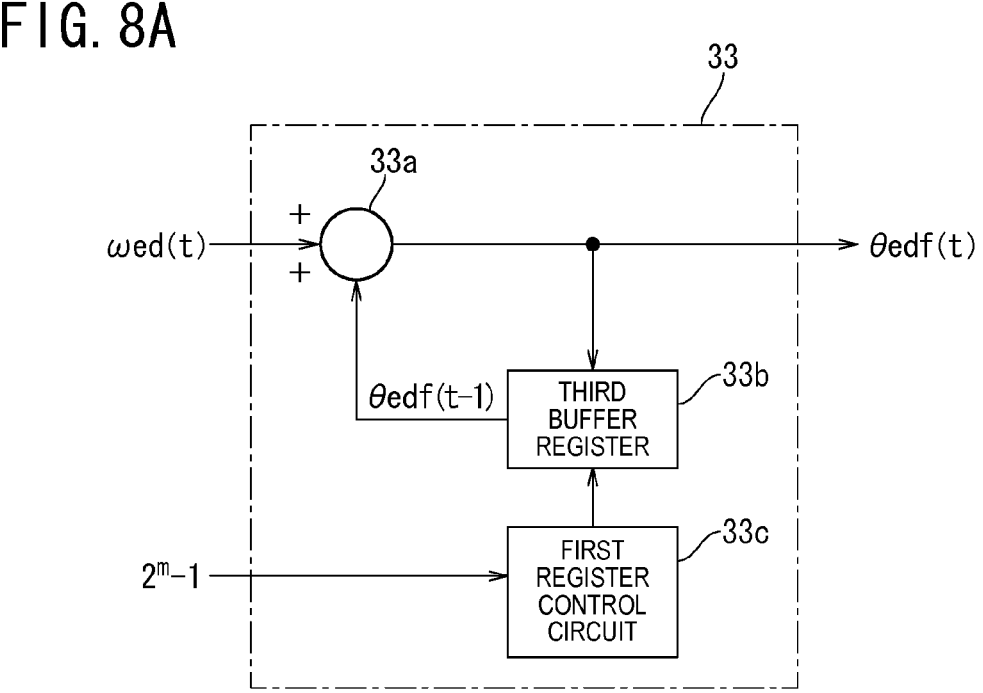
FIG. 8A is a circuit diagram illustrative of an example of a first integrator in the first embodiment.

As illustrated in FIG. 8A, the first integrator 33 includes a first adder 33a, a third buffer register 33b, and a first register control circuit 33c. One of the input terminals of the first adder 33a is electrically connected with an output terminal of the digital filter 32, and the other of the input terminals of the first adder 33a is electrically connected with an output terminal of the third buffer register 33b.

In such a configuration, the electrical angular velocity ωedf(t) from the digital filter 32 is input into one of the input terminals of the first adder 33a, and an electrical angle θedf(t−1) from the third buffer register 33b is input into the other input terminal.

The first adder 33a adds the electrical angular velocity ωedf(t) to the electrical angle θedf(t−1), operates the electrical angle θedf(t), and then outputs an operation result to the one-pole correction circuit 34.

As for the third buffer register 33b, an input terminal is electrically connected with an output terminal of the first adder 33a, so that an addition result (electrical angle θedf(t)) from the first adder 33a is input. The third buffer register 33b has a function of a delay element, such that a previous electrical angle θedf(t) previously input is delayed until the next electrical angle θedf(t+1) is input (for example, one-clock delay), and is input to the other input terminal of the first adder 33a. That is, the third buffer register 33b is configured to hold an accumulated value of the electrical angular velocity ωedf(t) that has been input.

The first register control circuit 33c has a function of clearing the accumulated value to "0", when the electrical angular velocity ωedf(t) of m bit (s) (0 to $2^m-1$) per one cycle of the electrical angle is input and the accumulated value held by the third buffer register 33b is "$2^m-1$". That is, the first integrator 33 in the first embodiment is configured to operate the electrical angle θedf(t) per one cycle of the electrical angle.

The one-pole correction circuit 34 has a function of correcting the electrical angle θedf(t) of every one cycle of the electrical angle corresponding to each pole of the multipolar optical encoder 11.

To be specific, angle correction data having repeatability (reproducibility) in which an error component acquired beforehand for each pole is added is stored in the memory 19. For the electrical angle θedf(t) that has been input, the one-pole correction circuit 34 carries out a correction process using its corresponding polar angle correction data. Then, the electrical angle TR(t) subjected to the correction is output to the second differentiator 35.

Figure 6B:
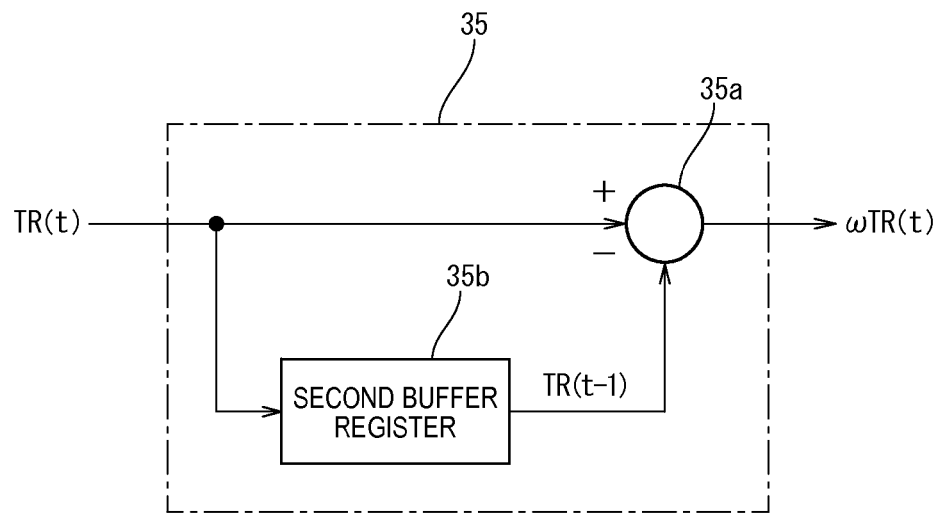
FIG. 6B is a circuit diagram illustrative of an example of a second differentiator in the first embodiment.

As illustrated in FIG. 6B, the second differentiator 35 includes a second subtractor 35a and a second buffer register 35b.

One of two input terminals of the second subtractor 35a and an input terminal of the second buffer register 35b are electrically connected with each other, and an electrical angle TR(t) from the one-pole correction circuit 34 is input into the second subtractor 35a and the second buffer register 35b. In addition, as for the second buffer register 35b, the output terminal is connected with the other input terminal of the second subtractor 35a, such that an output from the second buffer register 35b is input into the second subtractor 35a.

The second buffer register 35b functions as a delay element, and delays the electrical angle TR(t) that has been previously input until the next electrical angle TR(t+1) is input (for example, one-clock delay), and is input into the other input terminal of the second subtractor 35a.

In such a configuration, in the second subtractor 35a, the electrical angle TR(t−1) input one before is subtracted from the current electrical angle TR(t). That is to say, the second differentiator 35 is configured to operate the electrical angular velocity ωTR(t), which is a temporal change of the electrical angle TR(t). The second differentiator 35 is configured to output the electrical angular velocity ωTR(t), which is an operation result, to the second discontinuity correction circuit 36.

Like the first discontinuity correction circuit 31, the second discontinuity correction circuit 36 is a circuit configured to correct the electrical angular velocity ωTR(t), which is discontinuous at a timing when the pole is changed, in order to maintain the continuity.

Figure 7B:
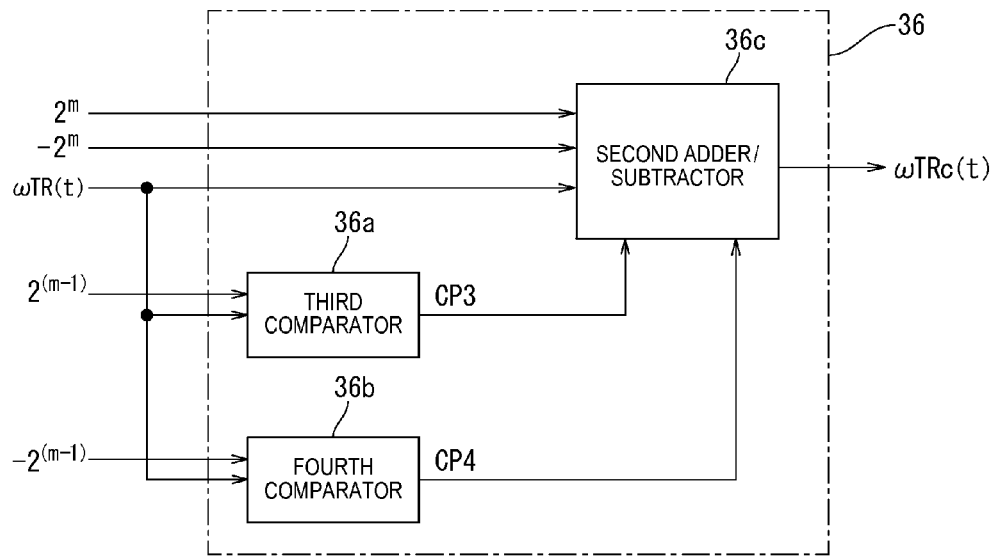
FIG. 7B is a circuit diagram illustrative of an example of a second discontinuity correction circuit in the first embodiment.

Specifically, as illustrated in FIG. 7B, the second discontinuity correction circuit 36 in the first embodiment includes a third comparator 36a, a fourth comparator 36b, and a second adder/subtractor 36c.

The third comparator 36a compares the electrical angular velocity ωTR(t) with a velocity threshold "$2^{(m-1)}$". When the electrical angular velocity ωTR(t) is equal to or larger than "$2^{(m-1)}$", the third comparator 36a outputs the third comparison signal CP3 of a logical value "1" to the second adder/subtractor 36c. When the electrical angular velocity ωTR(t) is smaller than "$2^{(m-1)}$", the third comparator 36a outputs the third comparison signal CP3 of a logical value "0" to the second adder/subtractor 36c.

The fourth comparator 36b compares the electrical angular velocity ωTR(t) with a velocity threshold "$-2^{(m-1)}$". When the electrical angular velocity ωTR(t) is equal to or smaller than "$-2^{(m-1)}$", the fourth comparator 36b outputs the fourth comparison signal CP4 of the logical value "1" to the second adder/subtractor 36c. When the electrical angular velocity ωTR(t) is larger than "$-2^{(m-1)}$", the fourth comparator 36b outputs the fourth comparison signal CP4 of the logical value "0" to the second adder/subtractor 36c.

When the third comparison signal CP3 is "1" and the fourth comparison signal CP4 is "0", the second adder/subtractor 36c subtracts "$2^m$" from the electrical angular velocity ωTR(t). Then, the second adder/subtractor 36c outputs the electrical angular velocity ωTRc(t), which is a subtraction result, to the second integrator 37.

In addition, when the third comparison signal CP3 is "0" and the fourth comparison signal CP4 is "1", the second adder/subtractor 36c adds "$2^m$" to the electrical angular velocity ωTR(t). Then, the second adder/subtractor 36c outputs the electrical angular velocity ωTRc(t), which is an addition result, to the second integrator 37.

On the other hand, when the third comparison signal CP3 is "0" and the fourth comparison signal CP4 is "0", the second adder/subtractor 36c outputs the electrical angular velocity ωTR(t) to the second integrator 37 without change. It is to be noted that the output signal in this case is also referred to as electrical angular velocity ωTRc(t).

Figure 8B:
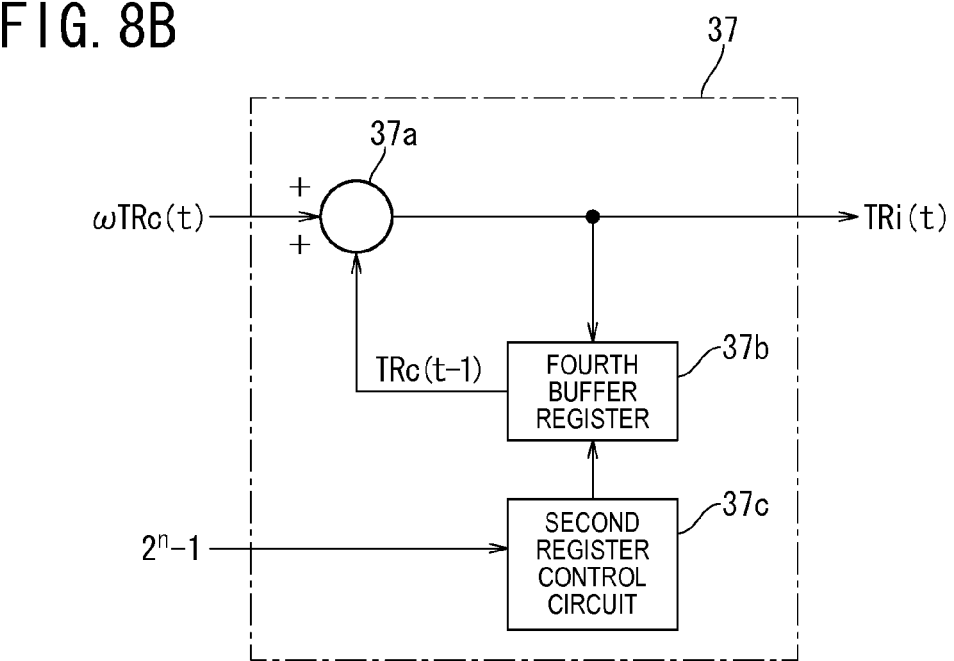
FIG. 8B is a circuit diagram illustrative of an example of a second integrator in the first embodiment.

As illustrated in FIG. 8B, the second integrator 37 includes a second adder 37a, a fourth buffer register 37b, and a second register control circuit 37c.

One of the two input terminals of the second adder 37a is electrically connected with an output terminal of the second discontinuity correction circuit 36, and the other of the two input terminal of the second adder 37a is electrically connected with an output terminal of the fourth buffer register 37b.

In such a configuration, the electrical angular velocity ωTRc(t) from the second discontinuity correction circuit 36 is input into one input terminal of the second adder 37a, an integral value TRi(t−1) from the fourth buffer register 37b is input into the other input terminal of the second adder 37a. The second adder 37a adds the electrical angular velocity ωTRc(t) to the electrical angle TRc(t−1), operates an integral value TRi (t), and then outputs an operation result to the fourth buffer register 37b and the second multiplier 39, respectively.

As for the fourth buffer register 37b, an input terminal is electrically connected with an output terminal of the second adder 37a, so that an addition result (integral value TRi(t)) from the second adder 37a is input. The fourth buffer register 37b has a function of a delay element, such that the integral value TRi(t) previously input is delayed until the next integral value TRi(t+1) is input (for example, one-clock delay) and is input into the other input terminal of the second adder 37a. That is to say, the fourth buffer register 37b is configured to hold an accumulated value of the electrical angular velocity ωTRc(t) that has been input.

The first register control circuit 33c has a function of clearing the accumulated value to "0", when the resolution of a predefined mechanical angle is n bits (where n is a natural number equal to or larger than 2) (numeric value range is 0 to $2^n-1$) and the accumulated value held by the fourth buffer register 37b is "$2^n-1$". It is to be noted that "n<N" is satisfied with the resolution n, when a register width of the fourth buffer register 37b is set to N bit.

That is to say, the second integrator 37 in the first embodiment is configured to operate the integral value TRi(t) (digital information) of the electrical angular velocity ωTRc(t) per one cycle of mechanical angle.

The resolution "$2^m$" of the predefined mechanical angle is input into one of two input terminals of the first multiplier 38, whereas "1/the number of poles" is input into the other one of the two input terminals of the first multiplier 38. Then, the first multiplier 38 multiplies "$2^m$" with "1/the number of poles", and outputs a multiplication result "$2^m$/the number of poles" to the second multiplier 39. Since the multipolar optical encoder 11 in the first embodiment has two poles, the multiplication result is "$2^{m-1}$". It is to be noted that the information on the resolution of the mechanical angle and the information on the number of poles are to be stored in the memory 19 beforehand.

An output terminal of the second integrator 37 is electrically connected with one of two input terminals of the second multiplier 39, whereas an output terminal of the first multiplier 38 is electrically connected with the other one of the two input terminals. In such a configuration, the integral value TRi(t) is input into one of the two input terminals of the second multiplier 39, whereas a multiplication result "$2^{m-1}$" of the first multiplier 38 is input into the other one of the two input terminals of the second multiplier 39.

The second multiplier 39 multiplies "$2^{m-1}$" by the integral value TRi(t), and operates digital angle information θmd per one cycle of the mechanical angle (hereinafter, referred to as "mechanical angle θmd" in some cases). Then, the "mechanical angle θmd" that has been operated is output to a circuit (not illustrated) on the subsequent stage.

(Working Operations)

Next, with reference to FIG. 1 to FIG. 8, working operation examples of the first angle detection apparatus 1 in the first embodiment will be described based on FIG. 9 and FIG. 10.

When the power is on, each buffer register of the first angle detection apparatus 1 is initialized. After that, when a rotational drive mechanism connected with a rotor 110 drives, the rotor 110 rotates, and an optical scale 111 attached at an end of the rotor 110 rotates.

Then, the detector 135 is configured to receive the transmitted light 73 that the source light 71 from the light source 141 has transmitted through the optical scale 111 and then entered, and to read the signal track T1 of the optical scale 111. Accordingly, from each of the first light-receiving unit PD1, the second light-receiving unit PD2, the third light-receiving unit PD3, and the fourth light-receiving unit PD4, the optical intensities I1, I2, I3, and I4 that are deviated in phase are output to the angle information operation circuit 160 depending on the rotation of the optical scale 111.

The angle information operation circuit 160 is configured to amplify, by the preamplifier AMP, the detection signals I1, I2, I3, and I4 output from the detector 135, and to carry out the operation processing on the differential signals Vc and Vs indicated by the above expressions (1) and (2) by using I1, I2, I3, and I4 amplified by the differential operation circuit DS. Then, the filter circuit NR is configured to remove noises from the differential signals Vc and Vs that have been operated, and to output the differential signals Vc and Vs from which the noises are removed to the multiplication circuit 12.

In receipt of the differential signals Vc and Vs, the multiplication circuit 12 operates a Lissajous pattern from these Vc and Vs, and operates the digital electrical angle θed depending on the rotational angle of the rotor 110. In this situation, the resolution (it is assumed 16 bits, here) of the electrical angle θed is electrically improved, and the electrical angle θed of 16 bits is output to the operation circuit 13.

The first differentiator 30 differentiates the electrical angle θed(t) that has been input, and outputs the electrical angular velocity ωed(t) which is a differentiation result to the first discontinuity correction circuit 31.

The first discontinuity correction circuit 31 compares the electrical angular velocity ωed(t) that has been input with a numeric value "32768" and "−32768", which are velocity thresholds. Then, when the electrical angular velocity ωed(t) is equal to or larger than "32768", "65536" is subtracted from the electrical angular velocity ωed(t) that has been input, and the electrical angular velocity ωedc(t) which is a subtraction result is output to the digital filter 32.

On the other hand, when the electrical angular velocity ωed(t) is equal to or smaller than "−32768", the first discontinuity correction circuit 31 adds "65536" to the electrical angular velocity ωed(t) that has been input, and outputs the electrical angular velocity ωedc(t), which is an addition result, to the digital filter 32.

In addition, when the electrical angular velocity ωed(t) is equal to or smaller than "32768" and larger than "−32768", the first discontinuity correction circuit 31 outputs the electrical angular velocity ωed(t) that has been input to the digital filter 32, as the electrical angular velocity ωedc(t).

That is, when the electrical angle θed suddenly changes when the pole is changed, the electrical angular velocity ωed(t) reaches the velocity that largely exceeds the maximum rotation speed. Hence, since the electrical angular velocity ωed(t) is discontinuous, the electrical angular velocity ωed(t) that produces such a discontinuous situation is corrected to maintain the continuity.

Here, since the resolution of the electrical angular velocity ωed(t) is set to 16 bits, the highest angular velocity is set to "32768" and "−32768" and the values of the discontinuous angular velocity are set to equal to or larger than "32768" and equal to or smaller than "−32768". It is to be noted that the difference between plus and minus is determined depending on the rotational direction of the rotor 110. For example, a clockwise rotational direction is set to plus, whereas a counterclockwise rotational direction is set to minus.

The digital filter 32 carries out the filter processing on the electrical angular velocity ωedc(t), in which the discontinuity has been corrected, by a digital low pass filter, so as to reduce a high-frequency noise component included in the electrical angular velocity ωedc(t). Then, the digital filter 32 outputs the electrical angular velocity ωedf(t) subjected to the noise reduction to the first integrator 33.

Figure 9A:
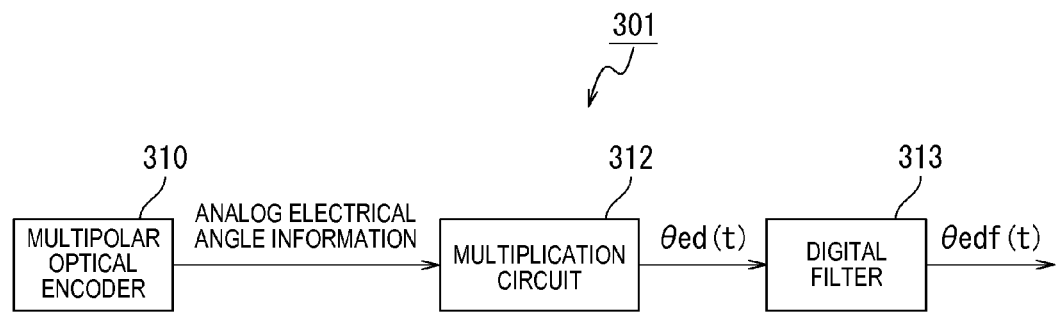
FIG. 9A is a block diagram illustrative of an example of an angle detection apparatus in one technology.
Figure 10:
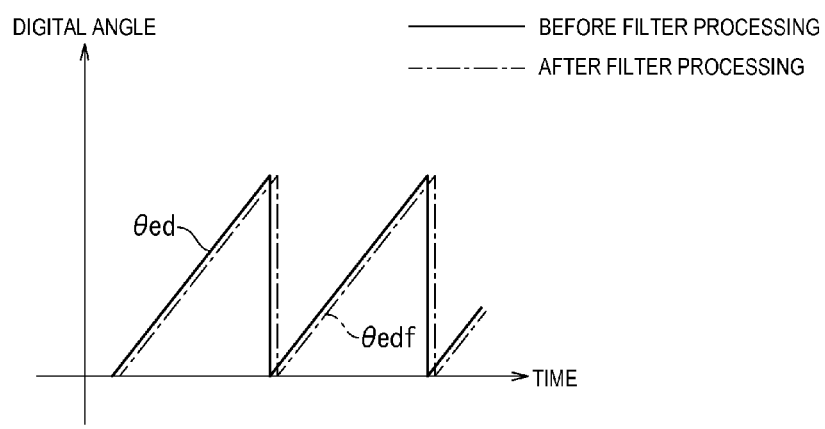
FIG. 10 is a view illustrative of an example of a digital angle output from the first integrator in the first embodiment.

As an angle detection apparatus in the prior technology, for example, there is a configuration illustrated in FIG. 9A. The angle detection apparatus 301 converts the analog electrical angle information output from the multipolar optical encoder 310 into the digital electrical angle θed(t) at the multiplication circuit 312, and carries out processing of reducing high-frequency noises of the electrical angle θed, by using the digital filter 313.

Figure 9B:
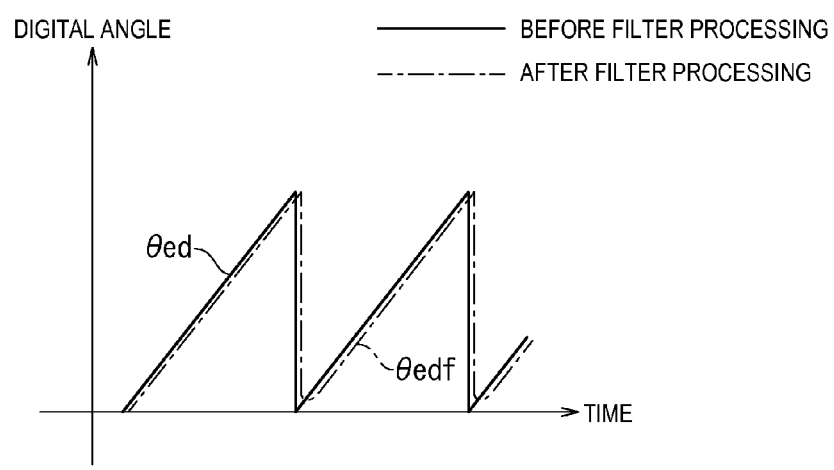
FIG. 9B is a view illustrative of an example of a digital angle output from the angle detection apparatus in one technology.

As described above, in the case of the multipolar optical encoder 310, as the electrical angle goes two cycles with respect to a single rotation of the mechanical angle, the electrical angle θed becomes discontinuous when the pole is changed and the electrical angle θed(t) changes to 0 degrees from 360 degrees. Accordingly, an input signal into the digital filter 313 changes in a stepwise manner when the pole is changed, an error with regard to the physical angle is larger. As a result, as illustrated in FIG. 9B, the electrical angle θedf(t) subjected to the filter processing produces a larger error when the pole is changed. As a response time of the filter is different depending on the rotation speed, such an error makes angle data without reproducibility, and therefore it is difficult to correct the data. Hence, in the angle detection apparatus 1 in the first embodiment, a discontinuous part is corrected beforehand to prevent generation of the angle data without reproducibility by the filter processing.

Subsequently, the first integrator 33 integrates the electrical angular velocity ωedf(t) that has been input and subjected to the noise reduction, operates the electrical angle θedf(t), and outputs the electrical angle θedf(t) that has been operated to the one-pole correction circuit 34.

Here, since the electrical angular velocity ωedf(t) is data of 16 bits, in the first integrator 33, the first register control circuit 33c clears the accumulated value to "0" at the time when the accumulated value held by the third buffer register 33b reaches "65536". That is, the first integrator 33 converts the electrical angular velocity ωedf(t) to be input into the angle information per one cycle of electrical angle.

It is to be noted that the digital electrical angle θedf(t) output from the first integrator 33 is the angle in which the digital electrical angular velocity ωedf(t) from which the discontinuity is cancelled in the first discontinuity correction circuit 31 is integrated. Accordingly, as indicated by an alternate long and short dash line of FIG. 10, the digital electrical angle θedf(t) subjected to the filter processing does not include an error without reproducibility caused by the discontinuity when the pole is changed.

The one-pole correction circuit 34 uses the angle correction data that is prepared beforehand for each pole to correct the electrical angle θedf(t) that has been input. Then, the electrical angle TR(t) subjected to the correction is output to the second differentiator 35. The second differentiator 35 differentiates the electrical angle TR(t) that has been input, and outputs the electrical angular velocity ωTR(t) which is a differentiation result to the second discontinuity correction circuit 36.

Like the first discontinuity correction circuit 31, the second discontinuity correction circuit 36 compares the electrical angular velocity ωTR(t) that has been input with a numeric value "32768" and "−32768", which are the velocity thresholds. Then, when the electrical angular velocity ωTR(t) is a value equal to larger than "32768" or equal to or smaller than "−32768", the second discontinuity correction circuit 36 corrects in a similar manner to the first discontinuity correction circuit 31 and, outputs the electrical angular velocity ωTRc(t) subjected to the correction to the second integrator 37. In addition, when the electrical angular velocity ωTR(t) is smaller than "32768" and larger than "−32768", the second discontinuity correction circuit 36 outputs the electrical angular velocity ωTR(t) that has been input to the second integrator 3, as the electrical angular velocity ωTRc(t).

The second integrator 37 integrates the electrical angular velocity ωTRc(t), from which the discontinuity has been cancelled and which has been input, and operates the integral value TRi(t), and outputs the integral value TRi(t) to the second multiplier 39.

Here, in the second integrator 37, based on the resolution (it is assumed 19 bits, here) of the mechanical angle which is set beforehand, the second register control circuit 37c clears the accumulated value to "0" at the time when the accumulated value held by the fourth buffer register 37b reaches "524287" ($2^{19}-1$). That is to say, the second integrator 37 converts the electrical angular velocity ωTRc(t) that has been input into digital information (an integral value) TRi(t) per one cycle of mechanical angle.

On the other hand, the first multiplier 38 multiplies the resolution "$2^{19}$" of the mechanical angle by "½ (the number of poles)", and outputs "262144" that is a multiplication result to the second multiplier 39.

The second multiplier 39 multiplies the integral value TRi(t) of 19 bits input from the second integrator 37 by "262144" input from the first multiplier 38 to operate the digital electrical angle θmd per one cycle of mechanical angle. Then, the second multiplier 39 outputs the mechanical angle θmd that has been operated to a circuit on the subsequent stage. That is to say, the first angle detection apparatus 1 outputs the mechanical angle θmd of an arbitrary resolution (19 bits) which is set beforehand to a circuit on the subsequent stage.

In the first embodiment first, the multipolar optical encoder 11 corresponds to a multipolar angle detector, the multiplication circuit 12 corresponds to a converter, the first differentiator 30 corresponds to a first angular velocity signal detector, and the first discontinuity correction circuit 31 corresponds to a first discontinuity correction unit.

In addition, in the first embodiment, the digital filter 32 corresponds to an angular velocity signal correction unit, the first integrator 33 corresponds to a second angle signal detector, and the one-pole correction circuit 34 corresponds to an angle signal correction unit.

In addition, in the first embodiment, the second differentiator 35 corresponds to a second angular velocity signal detector, the second discontinuity correction circuit 36 corresponds to a second discontinuity correction unit, the second integrator 37 corresponds to a third angle signal detector, and the first multiplier 38 and the second multiplier 39 correspond to an angle signal converter.

Effects of the First Embodiment (1) In the first angle detection apparatus 1 in the first embodiment, the multipolar optical encoder 11 having plural poles is configured to output the analog angle information signal corresponding to one cycle of the electrical angle for each pole. The multiplication circuit 12 is configured to convert the angle information signal output from the multipolar optical encoder 11 into the first angle signal (electrical angle θed(t)), which is a digital angle signal per one cycle of electrical angle. The first differentiator 30 is configured to differentiate the electrical angle θed(t), and to detect the first angular velocity signal (electrical angular velocity ωed(t)). The first discontinuity correction circuit 31 is configured to correct the value of the angular velocity that is discontinuous in the temporal change of the electrical angular velocity ωed(t), among the angular velocities indicated by the electrical angular velocity ωed(t) detected by the first differentiator 30, to a value with a continuity. The digital filter 32 is configured to carryout the correction processing of reducing an error component included in the first angular velocity signal (electrical angular velocity ωedc(t)) subjected to the correction processing carried out by the first discontinuity correction circuit 31. The first integrator 33 is configured to integrate the first angular velocity signal (electrical angular velocity ωedf(t)) subjected to the correction by the digital filter 32, and to detect the second angle signal (electrical angle θedf(t)).

In such a configuration, it is possible for the first discontinuity correction circuit 31 to correct the value of the angular velocity that is discontinuous in the temporal change of the electrical angular velocity ωed(t), among the angular velocities indicated by the electrical angular velocity ωed(t) detected by the first differentiator 30, to a value with a continuity.

Accordingly, effectiveness is obtainable such that it is possible to prevent an occurrence of the error caused by the electrical angular velocity ωed(t) that is discontinuous. For example, it is possible for the digital filter 32 to prevent an occurrence of the error without the reproductively, which is caused by the electrical angular velocity ωed(t) that is discontinuous.

In addition, it is possible to integrate the electrical angular velocity ωedf(t) in which a high-frequency noise component is reduced by the digital filter 32, and to detect the electrical angle θedf(t). Accordingly, effectiveness is obtainable such that the detection accuracy of the electrical angle θedf (t) is improved.

(2) The first discontinuity correction circuit 31 is configured to correct the value of the angular velocity equal to or larger than the speed threshold to a value having a continuity, when the angular velocity indicated by the electrical angular velocity ωed(t) is equal to or larger than a predefined velocity threshold.

In this situation, the upper limit velocity of the angular velocity is determined depending on the object to which the multipolar optical encoder 11 is applied. In addition, when the pole is changed, as the electrical angle suddenly changes to 0 degrees from 360 degrees, for example, the absolute value of the differentiation result of the electrical angle is an extremely large value. Such an extremely large differentiation value causes a discontinuity in the temporal change of the electrical angular velocity ωed(t).

Based on this, for example, when the resolution of the electrical angular velocity ωed(t) is set to "$2^m$" (where m is a natural number equal to or larger than 2), the velocity threshold is set to a sufficiently larger value such as "$2^{(m-1)}$" than the upper limit velocity.

Accordingly, since it is possible to appropriately correct the value of the angular velocity that causes an occurrence of discontinuity, effectiveness is obtainable such that the correction accuracy of the discontinuity is improved.

(3) In the first angle detection apparatus 1 in the first embodiment, the one-pole correction circuit 34 is configured to carry out the correction processing of reducing an error component included in the electrical angle θedf(t) that has been detected by the first integrator 33.

Here, the multipolar optical encoder 11 includes, for example, an error from an actual position having the reproducibility specific to a device.

Based on this, the one-pole correction circuit 34 is configured to carryout the correction processing of reducing an error component included in the electrical angle θedf(t).

Accordingly, effectiveness is obtainable such that the detection accuracy of the electrical angle θedf(t) can be further improved. That is to say, since it is made possible to correct the electrical angle θedf(t) for every one cycle of the electrical angle, it is possible to carry out the correction processing by using appropriate angle correction data for each pole, and to improve the correction accuracy.

(4) In the first angle detection apparatus 1 in the first embodiment, the first integrator 33 is configured to integrate the electrical angular velocity ωedf (t), and to detect the electrical angle θedf(t) per one cycle of the electrical angle. The second differentiator 35 is configured to differentiate the electrical angle θedf(t) per one cycle of the electrical angle subjected to the correction by the one-pole correction circuit 34, and to detect the second angular velocity signal (electrical angular velocity ωTR(t)). The second discontinuity correction circuit 36 is configured to correct the value of the angular velocity that is discontinuous in the temporal change, among the angular velocities indicated by the electrical angular velocity ωTR(t) detected by the second differentiator 35, to a value having a continuity. The second integrator 37 is configured to integrate the second angular velocity signal (electrical angular velocity ωTRc(t)) subjected to the correction processing carried out by the second discontinuity correction circuit 36, and to detect the third angle signal (electrical angular velocity ωTRc(t)) per one cycle of the mechanical angle of a predefined resolution. The first multiplier 38 and the second multiplier 39 are configured to convert the electrical angular velocity ωTRc(t) detected by the second integrator 37 into a mechanical angle signal (mechanical angle θmd).

In such a configuration, effectiveness is obtainable such that the electrical angle θedf(t) per one cycle of the electrical angle can be converted into the mechanical angle θmd of a predefined resolution.

(5) Whenever the first integrator 33 integrates the electrical angular velocity ωedf(t) for one cycle of the electrical angle, it is configured to clear the accumulated value of the first integrator 33. Whenever the second integrator 37 integrates the electrical angular velocity ωTRc(t) for one cycle of the mechanical angle of a predefined resolution, it is configured to clear the accumulated value of the second integrator 37. The first multiplier 38 and the second multiplier 39 are configured to multiply the electrical angular velocity ωTRc(t) with the value obtained by dividing the resolution by the number of the poles of the multipolar optical encoder 11, so as to convert the electrical angular velocity ωTRc(t) into the mechanical angle θmd.

In such a configuration, effectiveness is obtainable such that the electrical angle θedf(t) per one cycle of the electrical angle can be converted into an angle signal (mechanical angle θmd) per one cycle of the mechanical angle of a predefined resolution.

For example, when the resolution of the mechanical angle is set to "$2^m$", it is possible to obtain the multiplication result "$2^m$/the number of poles" by multiplying "$2^m$" by "1/the number of poles". Accordingly, it is possible to convert the electrical angle TR(t) to be input by a cycle of the electrical angle of the multipolar optical encoder 11 into the mechanical angle θmd of an arbitrary resolution (m bits).

(6) In the first angle detection apparatus 1 in the first embodiment, the operation circuit 13 is configured with FPGA. Accordingly, effectiveness is obtainable such that version up such as an addition of function or a design change such as revision in design value can be made easily.

Second Embodiment (Configuration)

Figure 11:
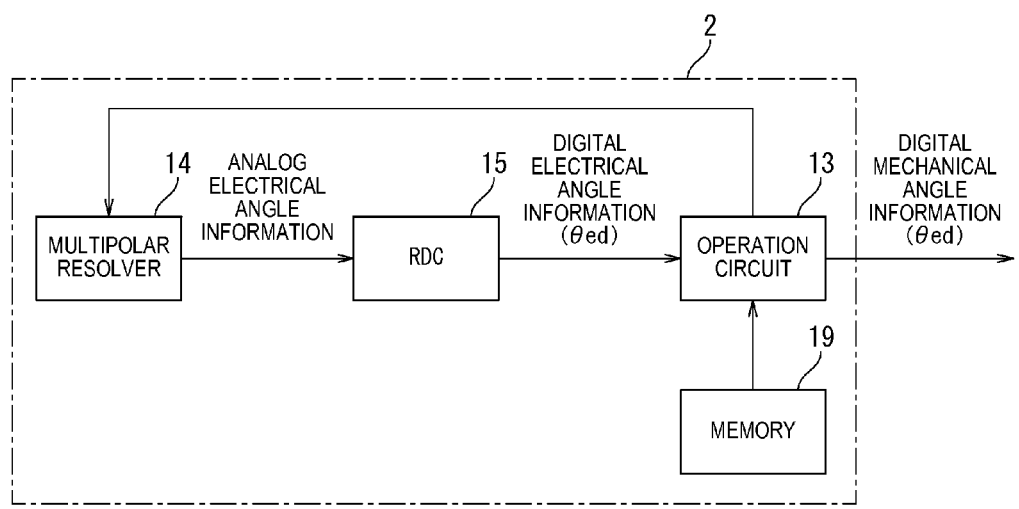
FIG. 11 is a block diagram illustrative of a configuration of a second angle detection apparatus in a second embodiment.

As illustrated in FIG. 11, a second angle detection apparatus 2 in a second embodiment has a similar configuration to the first angle detection apparatus 1, except that in the first angle detection apparatus 1 in the first embodiment, the multipolar optical encoder 11 is changed to a multipolar resolver 14, and the multiplication circuit 12 is changed to an RDC (Resolver/Digital Converter) 15. That is to say, the configurations of the operation circuit 13 and the memory 19 are similar to those in the first embodiment.

As to the components similar to those of the first embodiment, the same reference numerals are attached, and their explanations will be omitted appropriately, and only different units will be described in detail.

Figure 12:
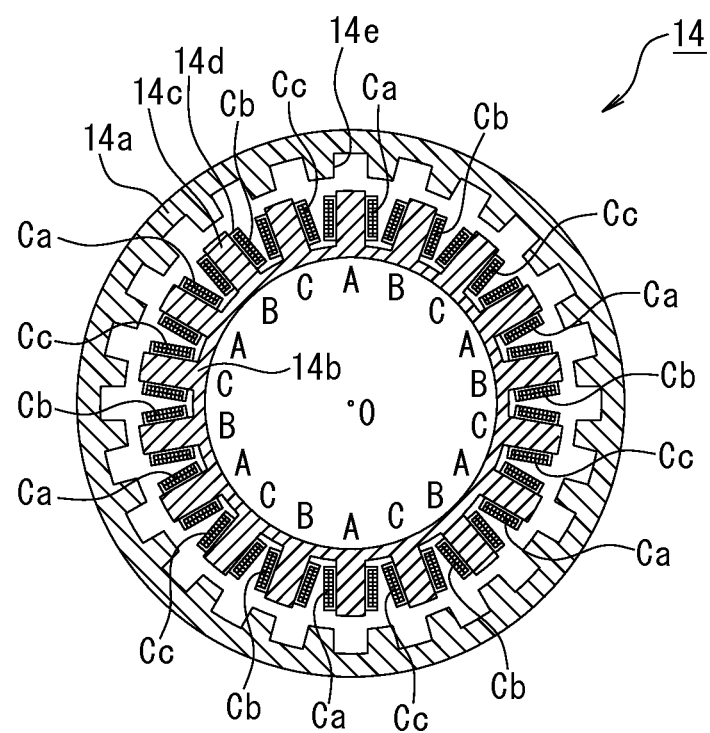
FIG. 12 is a view illustrative of a configuration example of a multipolar resolver in the second embodiment.

The multipolar resolver 14, includes a resolver rotor 14a, and a resolver stator 14b, as illustrated in FIG. 12. Then, the reluctance of a gap between the resolver rotor 14a and the resolver stator 14b is configured to change by the rotating angle position of the resolver rotor 14a, and a fundamental wave component in the reluctance change has plural cycles for a single rotation of the resolver rotor 14a.

24 pole teeth 14e in total are arranged to protrude in an internal tooth shape at equal intervals in a radial direction on an inner surface of the resolver rotor 14a. 18 stator poles 14c in total are arranged to protrude in an external tooth shape at equal intervals in a radial direction on an inner surface of the resolver stator 14b, so that a phase A, a phase B, and a phase C are deviated by 120 degrees of the electrical angle. It is to be noted that the number of the pole teeth 14e of the resolver rotor 14a and the number of the stator poles 14c are not limited to a combination of 24 and 18, but may take another combination of other numbers.

A coil bobbin 14d around which stator coils Ca to Cc are wound is attached to each stator pole 14c. When an excitation signal is supplied to a common line of the stator coils Ca to Cc, an alternating signal (analog electrical angle information) of 24 cycles for each phase is output, while the resolver rotor 14a is making a single rotation.

In addition, the multipolar resolver 14 in the second embodiment, although not illustrated, but includes an excitation circuit configured to supply an alternating signal (excitation signal) including a sinusoidal signal to the stator coils Ca to Cc, and an I/V converter circuit configured to convert a three-phase current signal output from the multipolar resolver 14 into a three-phase voltage signal. The multipolar resolver 14 further includes a phase converter circuit configured to convert the three-phase voltage signal into a two-phase voltage signal (sin signal and cos signal). Then, the phase converter circuit is configured to output the two-phase voltage signal (analog electrical angle information) to the RDC 15.

The RDC 15 has an A/D converter of m bits to convert the analog electrical angle information into digital electrical angle θed of m bits. The RDC 15 is configured to resolve the analog electrical angle information (sin signal and cos signal) from the multipolar resolver 14 with a m-bit accuracy in a range where the rotational velocity of the resolver rotor 14a does not exceed a predefined maximum velocity, and to generate a digital electrical angle θed.

To be specific, when the resolution is 16 bits, a conversion result is the digital angle signal θed of 65536 ($2^{16}$)×24 (the total number of the pole teeth 14e)=1572864 pulses for a single rotation of the resolver rotor 14a. In other words, the analog electrical angle information is converted into a digital value obtained by repeatedly counting up from 0 to 65535 24 times, while the multipolar resolver 14 is making a single rotation.

The RDC 15 is configured to output the electrical angle θed that has been generated to the operation circuit 13.

It is to be noted that except that "1/the number of the poles" is changed to "1/24", which is used for multiplication in the first multiplier 38, the configurations of the operation circuit 13 and the memory 19 are similar to those in the first embodiment, and their descriptions will be omitted. In addition, as to the operation, it is only different in that the analog electrical angle information (sin signal and cos signal) output from the multipolar resolver 14 is converted into the digital electrical angle θed by the RDC 15, and the digital electrical angle θed is input into the operation circuit 13. As to other operations, similar ones in the first embodiment are performed, and their descriptions will be omitted.

Here, in the second embodiment, the multipolar resolver 14 corresponds to a multipolar angle detector, the RDC 15 corresponds to a converter, the first differentiator 30 corresponds to a first angular velocity signal detector, and the first discontinuity revision circuit 31 corresponds to a first discontinuity correction unit.

Further, in the second embodiment, the digital filter 32 corresponds to an angular velocity signal correction unit, the first integrator 33 corresponds to a second angle signal detector, and the one-pole correction circuit 34 corresponds to an angle signal correction unit.

Also, in the second embodiment, the second differentiator 35 corresponds to a second angular velocity signal detecting element, the second discontinuity correction circuit 36 corresponds to a second discontinuity correction part, the second integrator 37 corresponds to a third angle signal detecting element, and the first multiplier 38 and the second multiplier 39 correspond to an angle signal converter.

Effects of the Second Embodiment (1) The second angle detection apparatus 2 in the second embodiment includes the multipolar resolver 14 and the RDC 15, instead of the multipolar optical encoder 11 and the multiplication circuit 12 in the first angle detection apparatus 2 in the first embodiment. Accordingly, similar operations and effectiveness to those in the first angle detection apparatus 1 in the first embodiment are obtainable.

Third Embodiment (Configuration)

A vehicle 3 in a third embodiment includes an electric power steering apparatus. A torque sensor included in the electric power steering apparatus includes the first angle detection apparatus 1 in the first embodiment, and a motor for steering assistance includes the second angle detection apparatus 2 in the second embodiment.

Figure 13:
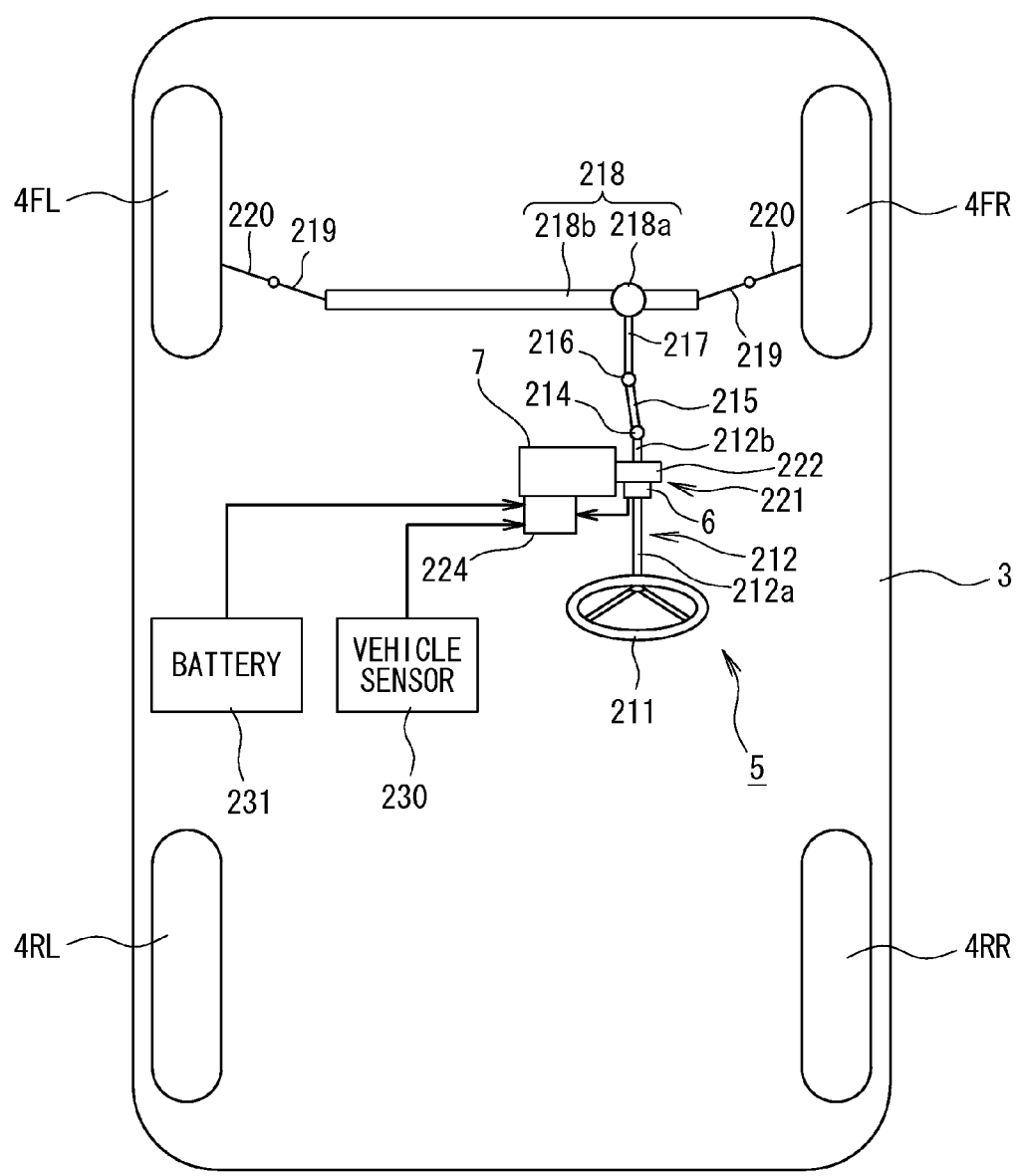
FIG. 13 is a view illustrative of a configuration example of an electric power steering apparatus mounted in a vehicle in a third embodiment.

Specifically, as illustrated in FIG. 13, the vehicle 3 includes front wheels 4FL and 4FR, which are left and right turning wheels, and rear wheels 4RL and 4RR. The front wheels 4FL and 4FR are turned by the electric power steering apparatus 5.

The electric power steering apparatus 5 includes, as a steering mechanism, a steering wheel 211, as steering shaft 212, a torque sensor 6, a first universal joint 214, a lower shaft 215, and a second universal joint 216, as illustrated in FIG. 13.

The electric power steering apparatus 5 further includes, as the steering mechanism, a pinion shaft 217, a steering gear 218, a tie rod 219, and a knuckle arm 220.

The steering force that has been given to the steering wheel 211 by a driver is transmitted to the steering shaft 212. The steering shaft 212 includes an input shaft 212a and an output shaft 212b. One end of the input shaft 212a is coupled with the steering wheel 211, and the other end is coupled through the torque sensor 6 with one end of the output shaft 212b.

Then, the steering force that has been transmitted to the output shaft 212b is transmitted to the lower shaft 215 through the first universal joint 214, and is further transmitted to the pinion shaft 217 through the second universal joint 216. The steering force that has been transmitted to the pinion shaft 217 is transmitted to the tie rod 219 through the steering gear 218. Furthermore, the steering force that has been transmitted to the tie rod 219 is transmitted to the knuckle arm 220, and then the front wheels 4FL and 4FR are turned as the turning wheels.

Here, the steering gear 218 is configured as a rack and pinion form including a pinion 218a coupled with the pinion shaft 217 and a rack 218b engaged with the pinion 218a. Thus, the steering gear 218 is configured to convert a rotational movement transmitted to the pinion 218a into a straight movement of the vehicle in a vehicle widthwise direction by the rack 218b.

In addition, a steering assistance mechanism 221 configured to transmit a steering assistance force to the output shaft 212b is coupled with the output shaft 212b of the steering shaft 212.

The steering assistance mechanism 221 includes a reduction gear 222, which is configured with, for example, a worm gear mechanism coupled with the output shaft 212b, a motor device 7 including an electric motor configured to generate a steering assistance force coupled with the reduction gear 222, and an EPS control unit 224 secured and supported at an outer circumferential part of the housing to cover the motor device 7.

(Torque Sensor 6)

The torque sensor 6 in the third embodiment is configured to detect the steering torque that has been given to the steering wheel 211 and transmitted to the input shaft 212a.

Figure 14:
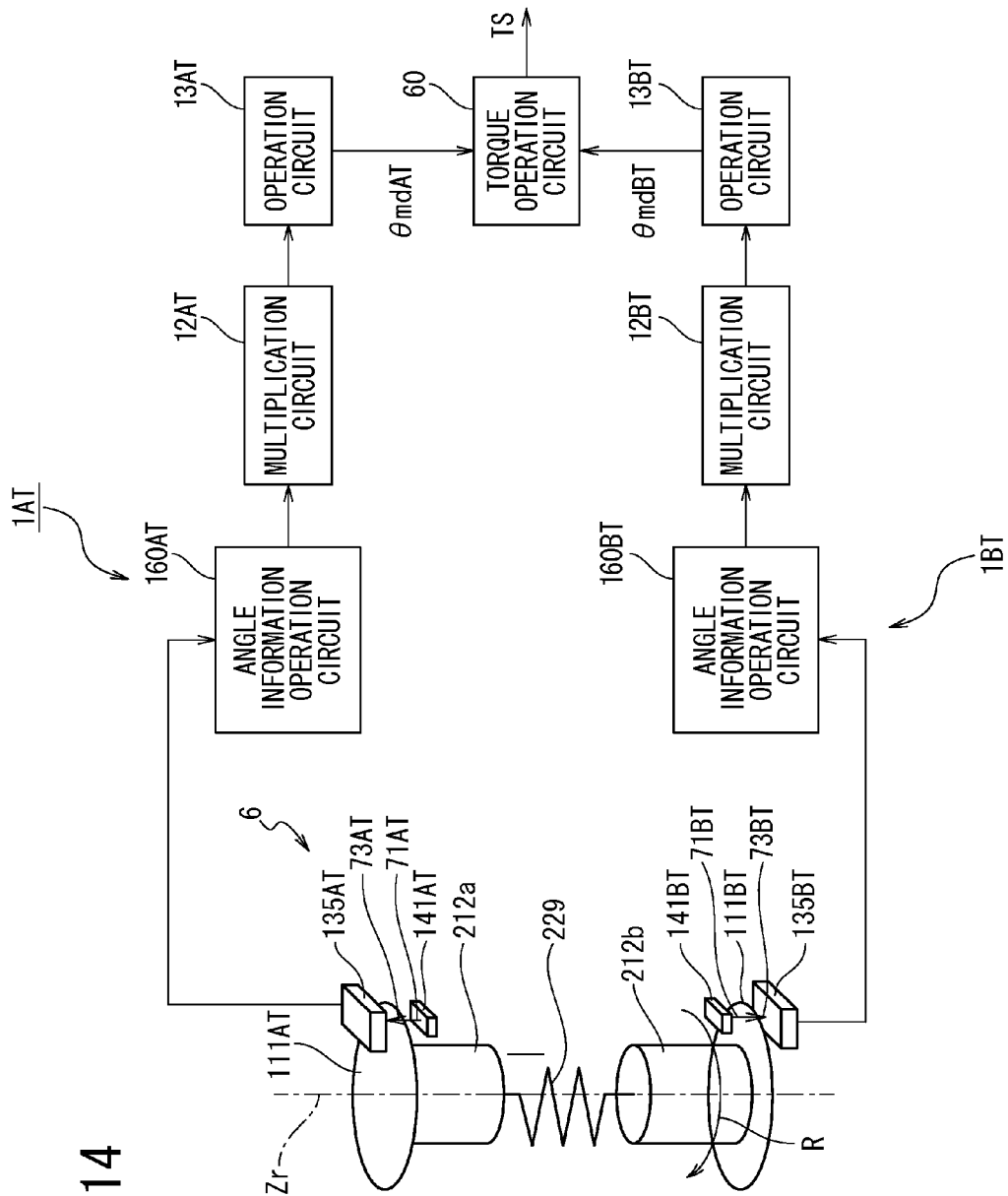
FIG. 14 is a view illustrative of a configuration example of a torque sensor to which the first angle detection apparatus is applied in the third embodiment.

As illustrated in FIG. 14, the torque sensor 6 includes a first angle detection apparatus 1AT, a first angle detection apparatus 1BT, a torsion bar 229, and a torque operation circuit 60. It is to be noted that since the torque sensor 6 in the third embodiment includes two sets of the first angle detection apparatus 1 in the first embodiment, AT and BT are added to their ends to distinguish them from each other. Hereinafter, AT and BT are also added to the ends of other components to distinguish them from each other.

As illustrated in FIG. 14, as to the torsion bar 229, one end thereof is attached to the input shaft 212a, and the other end thereof is attached to the output shaft 212b. An optical scale 111AT configured to protrude outward in a circle shape in the radial direction, when viewed in a planar view in a rotational axis Zr direction, is arranged at the outer circumferential part of the input shaft 212a, and an optical scale 111BT configured to protrude outward in a circle shape in the radial direction, when viewed in the planar view in the rotational axis Zr direction, is arranged at the outer circumferential part of the output shaft 212b. Accordingly, in accordance with the rotation of the input shaft 212a, the optical scale 111AT rotates, and the optical scale 111BT rotates in accordance with the rotation of the output shaft 212b.

In addition, as illustrated in FIG. 14, a detector 135AT is arranged at an upper side and a light source 141AT is arranged at a lower side interposing an optical scale 111AT between them. In such a configuration, a source light 71AT irradiated from the light source 141AT passes through the optical scale 111AT, and a transmitted light 73AT is received by the detector 135AT.

On the other hand, as illustrated in one FIG. 14, a light source 141BT is arranged at an upper side and a detector 135BT is arranged at a lower side interposing an optical scale 111B between them. In such a configuration, a source light 71BT irradiated from the light source 141BT passes through the optical scale 111BT, and a transmitted light 73BT is received by the detector 135BT.

In the above configuration, the torque sensor 6 is configured to detect a rotational displacement of the input shaft 212a, as a change in light intensity through the optical scale 111AT, and a rotational displacement of the output shaft 212b, as a change in light intensity through the optical scale 111BT. Then, from the change in the light intensity detected by the detector 135AT, differential signals VcAT and VsAT are generated by an angle information operation circuit 160AT, and are then output to the multiplication circuit 12AT on the subsequent stage. In addition, differential signal VcBT and VsBT are generated by an angle information operation circuit 160BT from the change in the light intensity detected by the detector 135BT, and are then output to the multiplication circuit 12BT on the subsequent stage.

Accordingly, the operation circuit 13AT is configured to operate a mechanical angle θmdAT depending on the rotational displacement of the input shaft 212a, and the operation circuit 13BT is configured to operate a mechanical angle θmdBT depending on the rotational displacement of the output shaft 212b. These mechanical angles θmdAT and θmdBT are output to the torque operation circuit 60. The torque operation circuit 60 is configured to operate the steering torque Ts based on a difference value between the mechanical angle θmdAT and the mechanical angle θmdBT (twisting of the torsion bar 229). The steering torque Ts is output to the EPS control unit 224.

(Motor Device 7)

Figure 15:
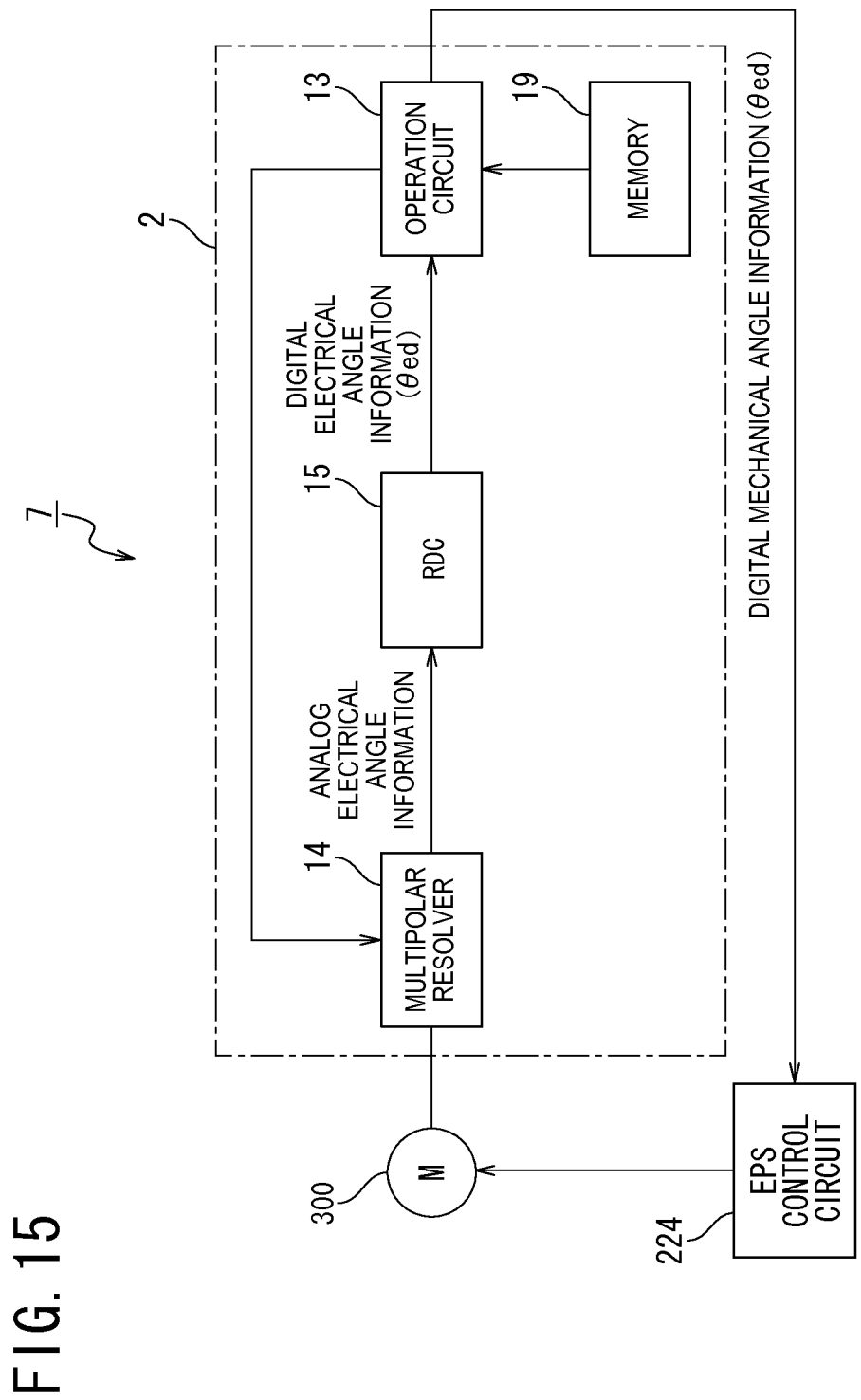
FIG. 15 is a view illustrative of a configuration example of a motor apparatus to which the second angle detection apparatus is applied in the third embodiment.

The motor device 7 in the third embodiment includes the second angle detection apparatus 2 and an electric motor 300, as illustrated in FIG. 15.

The electric motor 300 is a three-phase brushless motor, and includes a ring-shaped motor rotor and a ring-shaped motor stator, which are not illustrated. The motor stator includes plural teeth poles that protrude outward in the radial direction at equal intervals in the circumferential direction, and a coil for excitation wind around each of the pole teeth. Then, the motor rotor is arranged coaxially at the outside of the motor stator. The motor rotor is configured to face the pole teeth of the motor stator with a slight gap (air gap), and to include plural magnets arranged on an inner circumferential surface in a circumferential direction at equal intervals.

The motor rotor is secured to a motor shaft, and a three-phase alternating current is applied through the EPS control unit 224 to the coil of the motor stator, so that each tooth of the motor stator is excited in a predefined order, the motor rotor rotates, and the motor shaft rotates in accordance with the rotation.

In the third embodiment, the resolver rotor 14a of the multipolar resolver 14 is connected with the motor rotor, such that the resolver rotor 14a is configured to rotate in accordance with the rotation of the motor rotor.

Thus, in the second angle detection apparatus 2, the resolver rotor 14a of the multipolar resolver 14 rotates in accordance with the rotation of the motor rotor. Depending on such a rotation, a three-phase current signal is output from the multipolar resolver 14. The three-phase current signal is converted into a three-phase voltage signal by an I/V converter circuit. Subsequently, the converter circuit converts the three-phase voltage signal into a two-phase voltage signal (sin signal and cos signal), the two-phase voltage signal (analog electrical angle information) is output to the RDC 15, and the RDC 15 converts the analog electrical angle information into the digital electrical angle θed. Further, the operation circuit 13 carries out the discontinuity correction processing, the high-frequency noise reduction processing, and the angle correction processing on the digital electrical angle θed, and the digital electrical angle θed is converted into the digital mechanical angle θmd corresponding to the rotational angle position of the electric motor 300. The digital mechanical angle θmd is output to the EPS control unit 224.

(EPS Control Unit 224)

The EPS control unit 224 is not illustrated, but includes a current instruction operation circuit and a motor drive circuit. In addition, as illustrated in FIG. 13, a vehicle velocity V detected by a vehicle velocity sensor 230 and a direct current from a battery 231 as a direct current voltage source are input into the EPS control unit 224.

The current instruction operation circuit is configured to operate a current instruction value for driving the electric motor 300 based on the vehicle velocity V from the vehicle velocity sensor 230, the steering torque Ts from the torque sensor 6, and the mechanical angle θmd from the motor device 7.

The motor drive circuit is configured with, for example, a three-phase inverter circuit, and drives the electric motor 300 based on the current instruction value from the current instruction value operation circuit.

Here, in the third embodiment, the multipolar optical encoders 11AT and 11BT and the multipolar resolver 14 correspond to a multipolar angle detector, and the multiplication circuits 12AT and 12BT and the RDC 15 correspond to a converter.

In addition, in the third embodiment, the first differentiator 30 corresponds to a first angular velocity signal detector, the first discontinuity correction circuit 31 corresponds to a first discontinuity correction unit, the signal filter 32 corresponds to an angular velocity signal correction unit, the first integrator 33 corresponds to a second angle signal detector, and the one-pole correction circuit 34 corresponds to an angle signal correction unit.

Further, in the third embodiment, the second differentiator 35 corresponds to a second angular velocity signal detector, the second discontinuity correction circuit 36 corresponds to a second discontinuity correction unit, the second integrator 37 corresponds to a third angle signal detector, and the first multiplier 38 and the second multiplier 39 correspond to an angle signal converter.

Effects of the Third Embodiment

The third embodiment brings the following effectiveness in addition to the effectiveness in the first and the second embodiments.

(1) The torque sensor 6 in the third embodiment includes the first angle detection apparatuses 1AT and 1BT. The first angle detection apparatuses 1AT and 1BT are configured to detect the rotational displacement of the input shaft 212$a$ and the output shaft 212$b$ coupled with the torsion bar. Accordingly, the steering torque Ts can be operated based on the rotational displacement from which a harmonic noise component or a repetition error have been reduced appropriately by the discontinuity correction processing. Therefore, effectiveness is obtainable such that the detection accuracy of the steering torque Ts is improved.

(2) The motor device 7 in the third embodiment includes the second angle detection apparatus 2, and the second angle detection apparatus 2 is configured to detect the rotational angle position of the electric motor 300. Accordingly, it is possible to detect the rotational displacement from which a harmonic noise component or a repetition error has been reduced appropriately by the discontinuity correction processing. Effectiveness is obtainable such that the positioning accuracy is improved.

(3) The electric power steering apparatus 5 in the third embodiment includes the torque sensor 6 and the second angle detection apparatus 2. Accordingly, similar operations and effectiveness to the above torque sensor 6 and the motor device 7 in the above (1) and (2) are obtainable.

(4) The vehicle 3 in the third embodiment includes the electric power steering apparatus 5. Accordingly, similar operations and effectiveness to the above torque sensor 6 and the motor device 7 in the above (1) and (2) are obtainable.

(Variations)

(1) In each of the above embodiments, the digital filter 32 is configured to reduce a high-frequency noise component by using a digital low pass filter, but the present invention is not limited to this configuration. For example, any digital filer may be used for reducing a high-frequency noise component, as far as the filter can reduce the high-frequency noise component, such as a notch filter or the like.

(2) In each of the above embodiments, the first integrator 33 is configured to change with the accumulation value for one cycle of the electrical angle, and the one-pole correction circuit 34 is configured to carry out the correction processing on the electrical angle θedf for one cycle of the electrical angle, but the present invention is not limited to this configuration. For example, the first integrator 33 may be configured to change with the accumulation value of (one cycle of the electrical angle×the number of the poles) and the angle correction processing may be carried out for the integration result. In this case, it is possible to eliminate the circuit on the subsequent stage to the second differentiator 35 or later.

(3) In the third embodiment, the torque sensor 6 is configured with two sets of the first angle detection apparatuses 1 and the motor device 7 is configured with the second angle detection apparatus 2, but the present invention is not limited to this configuration. For example, another configuration may be applicable such that the torque sensor 6 is configured with two sets of the second angle detection apparatuses 2, and the motor device 7 is configured with the first angle detection apparatus 1.

Further, each of the above embodiments is merely an example of the present invention, and preferred various limitations have been described in a technical point of view. However, unless there is a specific description of limiting the present invention in the above description, the present invention is not limited to these embodiments. Furthermore, the drawings to be referred to in the above description are merely schematic views, which are different in the actual scale of length and breadth from the members and parts, in convenience of the illustration.

Heretofore, the entire disclosure of Japanese Patent Application No. 2014-162192 (filed on Aug. 8, 2004) including specification, claims, drawings, and abstract is incorporated herein by reference in its entirety.

Herein, the limited number of embodiments has been described with reference to the drawings, but the scope of the present invention is not limited to them. Variations and modifications thereof based on the above disclosure may be apparent to those skilled in the art.

REFERENCE SIGNS LIST

1 . . . first angle detection apparatus, 2 . . . second angle detection apparatus, 3 . . . vehicle, 5 . . . electric power steering apparatus, 6 . . . torque sensor, 7 . . . motor device, 11 . . . multipolar optical encoder, 12 . . . multiplication circuit, 13 . . . operation circuit, 14 . . . multipolar resolver, 15 . . . RDC, 19 . . . memory, 30 . . . first differentiator, 31 . . . first discontinuity correction circuit, 32 . . . digital filter, 33 . . . first integrator, 34 . . . one-pole correction circuit, 35 . . . second differentiator, 36 . . . second discontinuity correction circuit, 37 . . . second integrator, 38 . . . first multiplier, 39 . . . second multiplier, 300 . . . electric motor

The invention claimed is:

1. An angle detection apparatus, comprising:
a multipolar angle detector having a plurality of poles and configured to output an analog angle information signal corresponding to one cycle of an electrical angle for each of the plurality of poles;
a converter configured to convert the analog angle information signal output from the multipolar angle detector into a first angle signal, which is a digital angle signal for the one cycle of the electrical angle;

a first angular velocity signal detector configured to differentiate the first angle signal to detect a first angular velocity signal;

a first discontinuity correction unit configured to correct a value of an angular velocity that is discontinuous in a temporal change of the first angular velocity signal, among the angular velocities indicated by the first angular velocity signals detected by the first angular velocity signal detector, to a value having a continuity;

an angular velocity signal correction unit configured to carry out correction processing of reducing an error component included in the first angular velocity signal corrected by the first discontinuity correction unit; and a second angle signal detector configured to integrate the first angular velocity signal corrected by the angular velocity signal correction unit to detect a second angle signal.

2. The angle detection apparatus according to claim 1, wherein when the angular velocity indicated by the first angular velocity signal is equal to or larger than a predefined velocity threshold, the first discontinuity correction unit is configured to correct a value of the angular velocity equal to or larger than the predefined velocity threshold to a value having the continuity.

3. The angle detection apparatus according to claim 1, wherein the angular velocity signal correction unit is configured to carry out the correction processing of reducing a high-frequency noise component included in the first angular velocity signal, by using a digital filter.

4. The angle detection apparatus according to claim 1, further comprising an angle signal correction unit configured to carry out the correction processing of reducing the error component included in the second angle signal detected by the second angle signal detector.

5. The angle detection apparatus according to claim 4, wherein the second angle signal detector is configured to integrate the first angular velocity signal to detect the second angle signal for the one cycle of the electrical angle, further comprising:

a second angular velocity signal detector configured to differentiate the second angle signal for the one cycle of the electrical angle corrected by the angle signal correction unit to detect a second angular velocity signal;

a second discontinuity correction unit configured to correct the value of the angular velocity that is discontinuous in the temporal change of the second angular velocity signal, among the angular velocities indicated by the second angular velocity signals, detected by the second angular velocity signal detector, to the value having the continuity;

a third angle signal detector configured to integrate the second angular velocity signal corrected by the second discontinuity correction unit to detect a third angle signal for one cycle of a mechanical angle having a predefined resolution; and an angle signal converter configured to convert the third angle signal detected by the third angle signal detector into a mechanical angle signal.

6. The angle detection apparatus according to claim 5, wherein the second angle signal detector comprises a first integrator configured to integrate the first angular velocity signal to convert the first angular velocity signal into the second angle signal, such that an accumulated value of the first integrator is cleared whenever the first angular velocity signal for the one cycle of the electrical angle is integrated, the third angle signal detector comprises a second integrator configured to integrate the second angular velocity signal to convert the second angular velocity signal into the third angle signal, such that the accumulated value of the second integrator is cleared whenever the second angular velocity signal for the one cycle of the mechanical angle having the predefined resolution is integrated, and the angle signal convertor is configured to multiply a value obtained by dividing the predefined resolution by the number of the plurality of poles of the multipolar angle detector, by the third angle signal to convert the third angle signal into the mechanical angle signal.

7. The angle detection apparatus according to claim 1, wherein the multipolar angle detector is a multipolar optical encoder.

8. The angle detection apparatus according to claim 1, wherein the multipolar angle detector is a multipolar resolver.

9. The angle detection apparatus according to claim 1, wherein components except for the multipolar angle detector and the converter are configured with programmable logic circuits.

10. A motor comprising the angle detection apparatus according to claim 1.

11. A torque sensor comprising the angle detection apparatus according to claim 1.

12. An electric power steering apparatus comprising the angle detection apparatus according to claim 1.

13. A vehicle comprising the angle detection apparatus according to claim 1.

* * * * *